United States Patent
Kawai et al.

(10) Patent No.: US 9,932,415 B2
(45) Date of Patent: Apr. 3, 2018

(54) FORMYL GROUP-CONTAINING POROUS SUPPORT, ADSORBENT USING SAME, METHOD FOR PRODUCING SAME, AND METHOD FOR PRODUCING THE ADSORBENT

(71) Applicants: KANEKA CORPORATION, Osaka (JP); JNC Corporation, Tokyo (JP)

(72) Inventors: Yoshikazu Kawai, Osaka (JP); Hiroaki Kawasaki, Osaka (JP); Naomi Kawahara, Osaka (JP)

(73) Assignees: KANEKA CORPORATION, Osaka (JP); JNC CORPORATION, Tokyo (JP)

( * ) Notice: Subject to any disclaimer, the term of this patent is extended or adjusted under 35 U.S.C. 154(b) by 31 days.

(21) Appl. No.: 14/832,819

(22) Filed: Aug. 21, 2015

(65) Prior Publication Data

US 2015/0361185 A1    Dec. 17, 2015

Related U.S. Application Data

(62) Division of application No. 13/266,773, filed as application No. PCT/JP2009/006592 on Dec. 3, 2009.

(30) Foreign Application Priority Data

| Dec. 3, 2008 | (JP) | 2008-308893 |
| Dec. 3, 2008 | (JP) | 2008-308894 |
| Dec. 3, 2008 | (JP) | 2008-308895 |
| Dec. 3, 2008 | (JP) | 2008-308896 |
| Dec. 3, 2008 | (JP) | 2008-308897 |
| Dec. 3, 2008 | (JP) | 2008-308898 |
| Dec. 3, 2008 | (JP) | 2008-308899 |

(51) Int. Cl.
| B01J 20/32 | (2006.01) |
| B01J 20/28 | (2006.01) |
| C08B 37/00 | (2006.01) |
| B01J 20/289 | (2006.01) |

(52) U.S. Cl.
CPC ............ *C08B 37/00* (2013.01); *B01J 20/289* (2013.01); *B01J 20/3212* (2013.01); *B01J 20/3219* (2013.01); *B01J 20/3244* (2013.01); *B01J 20/3248* (2013.01)

(58) Field of Classification Search
CPC ... B01J 20/3212; B01J 20/289; B01J 20/3248
See application file for complete search history.

(56) References Cited

U.S. PATENT DOCUMENTS

| 3,947,352 A | 3/1976 | Cuatrecasas et al. |
| 4,356,170 A | 10/1982 | Jennings et al. |
| 4,727,136 A | 2/1988 | Jennings et al. |
| 4,762,713 A | 8/1988 | Anderson |
| 4,913,812 A | 4/1990 | Moriguchi et al. |
| 5,059,654 A | 10/1991 | Hou et al. |
| 5,144,008 A | 9/1992 | Ikeda et al. |
| 5,151,350 A | 9/1992 | Colbert et al. |
| 5,192,540 A | 3/1993 | Kuo et al. |
| 5,565,204 A | 10/1996 | Kuo et al. |
| 5,567,685 A | 10/1996 | Linden et al. |
| 5,821,343 A | 10/1998 | Keogh |
| 5,866,387 A | 2/1999 | Ogino et al. |
| 5,929,049 A | 7/1999 | Singh et al. |
| 5,969,130 A | 10/1999 | Jennings et al. |
| 6,080,589 A | 6/2000 | Kandil et al. |
| 6,340,461 B1 | 1/2002 | Terman |
| 6,361,777 B1 | 3/2002 | Hoogerhout |
| 6,451,317 B1 | 9/2002 | Blake et al. |
| 6,511,967 B1 | 1/2003 | Weissleder et al. |
| 6,573,245 B1 | 6/2003 | Marciani |
| 6,632,437 B1 | 10/2003 | Schneerson et al. |
| 8,048,432 B2 | 11/2011 | Lee et al. |

(Continued)

FOREIGN PATENT DOCUMENTS

| JP | 62-153753 A | 7/1987 |
| JP | 62-155300 A | 7/1987 |

(Continued)

OTHER PUBLICATIONS

Translation of JP 62-155300, 2013.*
Varma et al., Polymer Degradation and Stability, 77, 2002, 25-27.*
Baxter et al. Organic Reactions, vol. 59, 2002, John Wiley and Sons, Inc, Chapter 1.
Hermanson et al., Immobilized Affinity Ligand Techniques, Academic Press, 1992, p. 72.
Hershko A. Y. and Y. Naparstek, "Removal of Pathogenic Autoantibodies by Immunoadsorption," Ann. N.Y. Acad. Sci. (2005) vol. 1051, pp. 635-646.
Ito et al., "Immobilization of Protein Ligands on New Formyl-Spacer-Carriers for the Preparation of Stable and High Capacity Affinity Adsorbents," J. Biochem (1985), vol. 97, pp. 1689-1694.

(Continued)

*Primary Examiner* — Liam J Heincer
(74) *Attorney, Agent, or Firm* — Birch, Stewart, Kolasch & Birch, LLP

(57) ABSTRACT

The present invention relates to a method for producing a formyl group-containing porous base matrix, comprising the steps of introducing a spacer in a formyl group-containing porous particle; and then oxidizing the spacer with periodic acid and/or a periodate, to transform the part of the spacer into a formyl group; wherein the formyl group content in the porous particle after introduction of the spacer is not more than 3 μmol per 1 mL of the porous particle. Also, the present invention relates to a method for producing an adsorbent, comprising the step of immobilizing an amino group-containing ligand on the formyl group-containing porous base matrix. According to the present invention, a formyl-group containing porous base matrix and an adsorbent produced from the porous base matrix of which adsorption amount is high and which is has high strength and of which ligand is difficult to be leaked are provided.

10 Claims, No Drawings

(56) References Cited

U.S. PATENT DOCUMENTS

| | | | |
|---|---|---|---|
| 8,097,701 B2 | 1/2012 | Carrico et al. | |
| 2002/0026993 A1* | 3/2002 | Thornton | C08B 15/02 |
| | | | 162/175 |
| 2002/0131984 A1 | 9/2002 | Blake et al. | |
| 2003/0027788 A1 | 2/2003 | Singh et al. | |
| 2006/0062796 A1 | 3/2006 | Loibner et al. | |
| 2006/0105472 A1 | 5/2006 | Teng et al. | |
| 2007/0020293 A1 | 1/2007 | Michon | |
| 2007/0134197 A1 | 6/2007 | Eichner et al. | |
| 2007/0141084 A1 | 6/2007 | Lee et al. | |
| 2007/0154945 A1 | 7/2007 | Akiyama et al. | |
| 2007/0184295 A1 | 8/2007 | Chen et al. | |
| 2007/0231340 A1 | 10/2007 | Hausdorff et al. | |
| 2007/0243582 A1 | 10/2007 | Kosugi et al. | |
| 2009/0043077 A1 | 2/2009 | Berti | |
| 2009/0233847 A1 | 9/2009 | Hemberger et al. | |
| 2010/0184957 A1 | 7/2010 | Kawai et al. | |
| 2010/0239600 A1 | 9/2010 | Bigio et al. | |
| 2011/0021756 A1 | 1/2011 | Maeno | |
| 2011/0104114 A1 | 5/2011 | Adamson et al. | |
| 2011/0105730 A1 | 5/2011 | Bian et al. | |
| 2012/0108794 A1 | 5/2012 | Kawai et al. | |

FOREIGN PATENT DOCUMENTS

| | | |
|---|---|---|
| JP | 5-340948 A | 12/1993 |
| JP | 11-319402 A | 11/1999 |
| JP | 2008-279366 A | 11/2008 |
| WO | WO 88/02776 A1 | 4/1988 |
| WO | WO 2006/004067 A1 | 1/2006 |
| WO | WO 2008/146906 A1 | 12/2008 |

OTHER PUBLICATIONS

Kanamori et al., "Preparation of High-Capacity Affinity Adsorbents using Formyl Carriers and Their Use for Low- and High-Performance Liquid Affinity Chromatography of Trypsin-Family Proteases," J. Chromatography (1986), vol. 363, pp. 231-242.

Kasai et al., Affinity Chromatography, Tokyo Kagaku Dozin Co., Ltd., 1991 (with partial translation).

Sanderson, C. J. and D. V. Wilson, "A Simple Method for Coupling Proteins to Insoluble Polysaccharides," Immunology (1971), vol. 20, pp. 1061-1065.

Staudt et al., "Immunoadsorption in dilated cardiomyopathy: 6-month results from a randomized study," Am. Heart J. (2006), vol. 152, pp. 712.e1-712.e6.

Steindl et al., "A simple method to quantify staphylococcal protein A in the presence of human or animal IgG in various samples," J. Immunol. Methods (2000), vol. 235, pp. 61-69.

Extended European Search Report issued in European Application No. 09830207.8 dated Oct. 19, 2017.

* cited by examiner

FORMYL GROUP-CONTAINING POROUS SUPPORT, ADSORBENT USING SAME, METHOD FOR PRODUCING SAME, AND METHOD FOR PRODUCING THE ADSORBENT

CROSS REFERENCE TO RELATED APPLICATIONS

This application is a Divisional Application of co-pending U.S. application Ser. No. 13/266,773 filed on Oct. 27, 2011, which is the National Phase of PCT/JP2009/006592 filed on Dec. 3, 2009, which claims priority under 35 U.S.C. 119(a) to Japanese Patent Application Nos. JP 2008-308893, JP 2008-308894, JP 2008-308895, JP 2008-308896, JP 2008-308897, JP 2008-308898, and JP 2008-308899, each filed on Dec. 3, 2008, all of which are hereby expressly incorporated by reference into the present application.

TECHNICAL FIELD

The present invention relates to various adsorbents, especially to an adsorbent for treatment or medical use and an adsorbent for purifying an antibody drug.

BACKGROUND ART

A porous base matrix is used for a wide variety of adsorbents, such as an adsorbent for chromatography and an affinity adsorbent. Specifically, an affinity adsorbent is able to efficiently purify a target substance and reduce the content of unwanted substances, and is therefore used as a medical adsorbent and an adsorbent for purifying antibody drug. In particular, attention has been focused on adsorbents obtained by immobilizing protein A as an affinity ligand on a porous base matrix as medical adsorbents for the treatment of rheumatism, hemophilia and dilated cardiomyopathy (for example, Non-patent Document 1 and Non-patent Document 2).

Meanwhile, the adsorbent obtained by immobilizing protein A as an affinity ligand on a porous base matrix, i.e. adsorbents for purifying antibody drug, has attracted attention as an adsorbent able to specifically adsorb and release immunoglobulin (IgG). A method for immobilizing a variety of affinity ligands such as protein A on a porous base matrix can be selected from among a variety of immobilization methods, such as cyanogen bromide method, trichlorotriazine method, epoxy method and tresyl chloride method, described in Table 8.1 and FIG. 8.15 of Non-patent Document 3. In particular, it is preferable from an industrial perspective to use the reaction between a formyl group on a porous base matrix and an amino group on an affinity ligand so as to effect immobilization in terms of safety and for reasons such as the ease of the immobilization reaction and the fact that it is possible to use proteins or peptides produced by a relatively simple method.

As a method for introducing formyl groups in a porous base matrix, a method in which a polysaccharide gel having vicinal hydroxy groups is oxidized using periodate oxidation so as to generate formyl groups on the sugar chain can be used (for example, refer to Non-patent Document 4). The porous base matrix is hereinafter abbreviated to a "sugar chain cleavage-type" porous base matrix. An adsorbent obtained via the method has the advantage of having little ligand leakage.

In addition, it is possible to use a method that introduces formyl group via a variety of spacers obtained by, for example, a method that uses glutaraldehyde or a method in which periodate is made to act on glyceryl group obtained through the ring opening of epoxy group, which are disclosed in FIG. 8.15 of Non-patent Document 3 or Non-patent Document 5. The porous base matrix is hereinafter abbreviated to a "spacer-type" porous base matrix. The adsorbent produced by using the spacer-type formyl group-containing porous base matrix tends to have relatively high adsorption of a target substance. In addition, a method in which an amino sugar is introduced in an epoxy group of a porous particle and the amino sugar part is oxidatively cleaved to obtain a formyl group and an amino group-containing ligand is immobilized to the formyl group is described in Patent Document 1.

PRIOR ART DOCUMENT

Patent Document

Patent Document 1: JP62-15300A

Non-Patent Document

Non-patent Document 1: Annals of the New York Academy of Sciences, 2005, vol. 1051, p. 635-646
Non-patent Document 2: American Heart Journal, vol. 152 (4), 2006
Non-patent Document 3: Affinity Chromatography, written by KASAI Kenichi et al., published by Tokyo Kagaku Dozin Co., Ltd., 1991
Non-patent Document 4: Immunology, vol. 20, p. 1061, 1971
Non-patent Document 5: Immobilized Affinity Ligand Techniques, Greg T. Hermanson et al., Academic Press, 1992

DISCLOSURE OF THE INVENTION

Problems to be Solved by the Invention

However, in the above-described sugar chain cleavage-type porous base matrix having formyl group, the sugar chain may be cleaved by a strong oxidative reaction. As a result, the strength of the porous base matrix may become poor and use at high linear speeds may become difficult in some cases. Moreover, when such an adsorbent is used for purifying an antibody drug, the adsorbed amount of antibody, which is the target substance, tends to be relatively small, and it is not easy to purify the antibody at high speed. Meanwhile, the spacer-type porous base matrix having formyl group is not desirable in terms of safety and purity, since the affinity ligand may leak out during treatment or purification of the target substance and contaminate either the patient's blood or the purified product if the introduced amount of formyl groups is small.

In the method described in Patent Document 1, the epoxy group is inevitably cleaved to generate an undesirous glyceryl group when a porous particle is epoxidized, although the fact is not clearly described in general documents in the affinity chromatography field, such as Non-patent Document 3 and Non-patent Document 5, and product catalogs of an activated base matrix. The present inventors found that when a formyl group is introduced by the oxidative cleavage of an amino sugar, the glyceryl group generated by the cleavage of the epoxy group is similarly oxidized, and the formyl group which is similar to the above-described spacer-type is introduced; as a result, an affinity ligand is easily leaked out in some cases.

The present invention addresses the above-mentioned problems of the prior art, and aims to provide a formyl group-containing porous base matrix which increases safety during treatment and purification, achieves an increase in speed and further increases the purity of a purified product; an adsorbent produced using the porous base matrix; methods for producing the porous base matrix and the adsorbent; and a purification method using the porous base matrix and the adsorbent.

Means for Solving the Problems

The present inventors made various investigations to solve the above-mentioned problems and consequently completed the present invention.

The method for producing a formyl group-containing porous base matrix according to the present invention is characterized in comprising the steps of
introducing a spacer in a formyl group-containing porous particle; and
then oxidizing the spacer with periodic acid and/or a periodate, to transform the part of the spacer into a formyl group;
wherein the formyl group content in the porous particle after introduction of the spacer is not more than 3 μmol per 1 mL of the porous particle.

Also, the method for producing a formyl group-containing porous base matrix according to the present invention is characterized in comprising the step of reacting a porous base matrix or a spacer-introduced porous base matrix with periodic acid or a periodate in a reaction mixture having a pH adjusted to a range of not less than 1 and not more than 6 using an acid.

In addition, the method for producing a formyl group-containing porous base matrix according to the present invention is characterized in comprising the step of reacting a porous base matrix or a spacer-introduced porous base matrix with periodic acid or a periodate at a temperature range of not less than 0° C. and not more than 10° C.

The present invention also relates a formyl group-containing porous base matrix produced by any one of the above-mentioned methods for producing a formyl group-containing porous base matrix.

The present invention also relates a method for producing an adsorbent, characterized in comprising the step of immobilizing an amino group-containing ligand on the above-mentioned formyl group-containing porous base matrix.

The present invention also relates to a method for producing an adsorbent, characterized in comprising the step of immobilizing an amino group-containing ligand on the formyl group-containing base matrix in an aqueous solution containing one or more kinds of compounds in which a carboxylate is selected as an indispensable component from the group consisting of a carboxylate, a metal halide and a sulfate.

The present invention also relates to a method for producing an adsorbent, characterized in comprising the step of immobilizing an amino group-containing ligand on the formyl group-containing base matrix in a reaction mixture containing a citrate and/or a sulfate.

The present invention also relates to a method for producing an adsorbent, characterized in comprising the steps of immobilizing an amino group-containing ligand on a formyl group-containing porous base matrix in two stages of imination and reductive reaction; and then stabilizing procedure is carried out after the imination.

The present invention also relates to a method for producing an adsorbent, wherein the immobilized bond of the ligand is stabilized and a remaining formyl group is simultaneously inactivated using an organic borane complex when an amino group-containing ligand is immobilized on the formyl group-containing base matrix.

The present invention also relates to an adsorbent, wherein the amount of the amino group-containing ligand to be introduced is not less than 1 mg and not more than 500 mg per 1 mL of the porous base matrix.

The present invention also relates to an adsorbent, wherein the amount of the amino group-containing ligand to be introduced is not less than 0.01 μmol and not more than 15 μmol per 1 mL of the porous base matrix.

The present invention also relates to a method for producing an adsorbent, wherein the amino group-containing ligand is protein A.

The present invention also relates to an adsorbent, wherein the average concentration of the ligand leaked into a target substance from the adsorbent of the first purification to third purification is not more than 50 ppm.

The present invention also relates to an adsorbent, wherein compression stress is not less than 0.01 MPa and not more than 1 MPa when the adsorbent is 5%-compressed; compression stress is not less than 0.03 MPa and not more than 3 MPa when the adsorbent is 10%-compressed; and compression stress is not less than 0.06 MPa and not more than 5 MPa when the adsorbent is 15%-compressed.

The present invention also relates to a method for producing an adsorbent, an adsorbent produced by the production method, and a purification method using the adsorbent.

The present invention also relates to a purification method, wherein a column having a diameter of not less than 0.5 cm and a height of not less than 3 cm is used.

The present invention also relates to a purification method, characterized in comprising the step of passing a liquid at a linear speed of not less than 100 cm/h and not more than 1000 cm/h.

Effect of the Invention

According to the present invention, a formyl group-containing porous base matrix having high strength can be provided. The formyl group-containing porous base matrix of the present invention can be preferably used in an adsorbent, and an adsorbent that adsorbs a large quantity of a target substance and hardly suffers from ligand leakage can be obtained using the porous base matrix. In addition, according to the adsorbent of the present invention, it is also possible to increase safety during treatment and purification and to increase the speed and purity of treatment and purification.

MODE FOR CARRYING OUT THE INVENTION

The method for producing a formyl group-containing porous base matrix according to the present invention is characterized in comprising the steps of introducing a spacer in a formyl group-containing porous particle; and then oxidizing the spacer with periodic acid and/or a periodate, to transform the part of the spacer into a formyl group; wherein the formyl group content in the porous particle after introduction of the spacer is not more than 3 μmol per 1 mL of the porous particle. An adsorbent can be obtained by introducing an affinity ligand in the porous base matrix. From the adsorbent, the amount of the ligand to be leaked is small. In addition, the production lots are not widely varied.

In order to suppress the leaching of the ligand, generally, the reductive reaction after the ligand immobilization is commonly investigated; on the other hand, not only such investigations, the present inventors focused on a treatment of the remaining formyl group in the porous particle which is not used for the reaction at the stage of a precursor of the formyl group-containing base matrix for introducing a formyl group, that is, after introduction of a spacer in the formyl group-containing porous particle. In other words, the present inventors assumed that the remaining formyl group of the porous particle which is not treated became a cause of the leakage.

The present inventors investigated a method for treating the remaining formyl group of the porous particle which is not used for the spacer introduction reaction after introduction of a spacer in the formyl group-containing porous particle; and as a result, the inventors completed a porous base matrix which has no formyl group or of which content of the formyl group is not more than 3 µm per 1 mL of the base matrix after the spacer introduction. In the case where a formyl group-containing porous base matrix is produced by using such a porous base matrix after the spacer introduction, surprisingly, with respect to an adsorbent after affinity ligand introduction, the amount of the ligand to be leaked can be lowered and the variation among lots of the adsorbent production can be suppressed. Consequently, the complication of post-treatment of purification can be lessened and the safety of the antibody drug can be increased in the case of using the adsorbent for purifying an antibody drug.

The content of the formyl group in the porous base matrix after the spacer introduction is preferably not less than 0 µmol and not more than 3 µmol, more preferably not less than 0 µmol and not more than 2 µmol, furthermore preferably not less than 0 µmol and not more than 1 µmol, particularly preferably not less than 0 µmol and not more than 0.5 µmol, and most preferably not less than 0 µmol and not less than 0.3 µmol, per 1 mL of the porous base matrix.

A compound to be introduced as a spacer in the porous base matrix and the adsorbent of the present invention may be any compound with no particular limitation; however, the compound having a ring structure is preferable since the amount of the ligand to be leaked is decreased. A compound having a ring structure is not particularly limited, and is exemplified by 5-member or 6-member ring containing only carbon, such as cyclopentane and cyclohexane; and a sugar and the analog thereof, such as furanose and pyranose. In particular, a sugar and the analogs of sugar are preferable due to the ease of availability. Further, from the viewpoints that the bond between the affinity ligand and the porous base matrix becomes firmer and/or that dissociation of the affinity ligand becomes more difficult, it is more preferable that a sugar is a reducing sugar.

In the porous base matrix of the present invention, the compound to be introduced as a spacer may be any compound with no particular limitation; and when a periodic acid oxidation method and the like are used, it is preferable that carbon atoms having a hydroxy group at an equatorial position are adjoining in the spacer, and the number of the adjoiong carbon atoms having a hydroxy group at an equatorial position is 2 or 3.

In the porous base matrix of the present invention, as a method for introducing a spacer, it is preferable to utilize the reaction between a functional group of the formyl group-containing porous particle and a functional group of the compound to be introduced as a spacer. The functional group of the formyl group-containing porous particle and the functional group of the compound to be introduced as a spacer are not particularly limited, respectively, and it is preferable to employ a mutually reactive combination and it is also preferable to use a compound to be interposed therebetween. When the formyl group of the formyl group-containing porous particle is utilized, it is preferable that the compound to be introduced as a spacer has a functional group capable of reacting with the formyl group. The functional group reactive with the formyl group is not particularly limited as long as the group can react with the formyl group, and an amino group is exemplified and preferable. That is, it is more preferable that the compound to be introduced as a spacer in the porous base matrix of the present invention contains an amino group; and when the compound to be introduced as a spacer is a sugar, an amino sugar is preferable.

The present inventors found that when a primary or secondary amine having a 1,2-glycol structure is used for condensation reaction with the formyl group-containing porous particle at pH in a range of not less than 7 and not more than 11 and/or the formed bond is stabilized by reductive reaction, surprisingly, the 1,2-glycol structure can be introduced efficiently in the porous base matrix. The range of the pH is more preferably not less than 8 and not more than 10, and particularly preferably not less than 8.5 and not more than 9.5.

An amino group-containing sugar, i.e. amino sugar, which is introduced in the porous particle according to the present invention is not particularly limited. As the amino group-containing sugar, one or more selected from glucosamine, galactosamine, annosamine, lactosamine, fucosamine, mannosamine, meglumine, allosamine, altrosamine, ribosamine, arabinosamine, gulosamine, idosamine, talosamine, xylosamine, lyxosamine, sorbosamine, tagatosamine, psicosamine, fructosamine, iminocyclitol, a mucopolysaccharide, a glycoprotein, hyaluronic acid, heparin, chondroitin, chondroitin 4-sulfate, dermatan sulfate; a D-isomer, a L-isomer and a racemate thereof; a polysaccharide, a polymer, a glycolipid and the like which contain the above example as a constituent component; and a salt such as hydrochlorides thereof can be exemplified. Among the examples, glucosamine and a derivative thereof are more preferable as a sugar which can be introduced as a spacer in the porous base matrix according to the present invention.

Glucosamine to be introduced in the porous base matrix according to the present invention is not particularly limited, and D-form is more preferable. The method for producing the glucosamine able to be used in the present invention is not particularly limited; and it is possible to use the glucosamine produced by chemically modifying glucose and the like, the glucosamine derived from shells of crustaceans and the like, chitin, chitosan and the like. When the present invention is applied for purifying an antibody drug, the glucosamine obtained from plant compound and the like, such as the so-called fermented glucosamine manufactured by Kyowa Hakko Kogyo Co., Ltd., are preferred. In addition, the glucosamine able to be used in the present invention is preferably in the form of a salt such as a hydrochloride in terms of solubility.

The amount of sugar or sugar analogue to be introduced as a spacer in the porous base matrix according to the present invention is preferably not less than 1 µmol and not more than 500 µmol per 1 mL of the porous base matrix. It is preferable that the amount of sugar or sugar analogue to be introduced is not less than 1 µmol per 1 mL of the porous base matrix in terms of increasing the adsorbing amount of target substance when the porous base matrix is used as an adsorbent. The amount of not more than 500 µmol is preferable, since the production cost can be limited. The amount of a sugar or a sugar analogue to be introduced is more preferably not less than 2 µmol and not more than 250 µmol, even more preferably not less than 4 µmol and not more than 125 µmol, particularly preferably not less than 6 µmol and not more than 50 µmol, the most preferably not less than 8 µmol and not more than 25 µmol, per 1 mL of the porous base matrix. The amount of sugar or sugar analogue to be introduced can be determined by measuring the reduction in quantity of the sugar or sugar analogue in the reaction mixture after the introduction reaction is completed, by titration such as non-aqueous titration onto the porous base matrix after the reaction, or by elemental analysis.

When a compound to be introduced as a spacer is introduced in the formyl group-containing particle, the use amount of the compound to be introduced as a spacer is not particularly limited; but the amount is preferably not less than 0.01 times by mole relative to the functional group in the porous base matrix in order to obtain a more appropriate introduction amount, and/or is preferably not more than 100 times by mole in terms of waste fluid disposal and efficiency. The amount is more preferably not less than 0.1 times by mole and not more than 50 times by mole, further preferably not less than 0.5 times by mole and not more than 20 times by mole, and particularly preferably not less than 1 time by mole and not more than 10 times by mole.

The solvent used when a compound to be, introduced as a spacer is introduced in the porous particle is not particularly limited; and water, a commonly used organic solvent such as dimethyl sulfoxide, dimethyl formamide and dioxolane, an alcohol such as ethanol, methanol and propanol, or a mixed solvent of two or more thereof can be used.

The pH of the reaction mixture is not particularly limited; but it is preferable to carry out the reaction at pH of not less than 3 in terms of reaction efficiency, and the pH is preferably not more than 13 in terms of loss of activity of the functional group and damage to the porous base matrix. The pH is more preferably not less than 4 and not more than 12, further preferably not less than 6 and not more than 11, particularly preferably not less than 7 and not more than 11.

The temperature when a compound to be introduced as a spacer is introduced in the porous base matrix is not particularly limited; but the temperature is preferably not less than 0° C. due to advantage in terms of the reaction rate, preferably not more than 100° C. in terms of safety and damage to the base matrix, and more preferably not more than 70° C. for the reason that the activity of the functional groups are hardly lost. The temperature is more preferably not less than 4° C. and not more than 50° C., further preferably not less than 4° C. and not more than 30° C., particularly preferably not less than 10° C. and not more than 25° C., and most preferably not less than 12° C. and not more than 18° C.

It is preferable that the introduction reaction is carried out under stirring or shaking, and the number of revolution or vibration per minute is not particularly limited, but the number is preferably not less than 1 and not more than 1000, more preferably not less than 10 and not more than 500, further preferably 30 and not more than 300, particularly preferably not less than 50 and not more than 200, most preferably not less than 75 and not more than 150, since uniform stirring is possible and for reasons such as not causing physical damage to the porous base matrix. It is particularly preferred to adjust the stirring rate according to differences in the specific gravities of the raw materials and the strength of the porous base matrix.

The reaction time when a compound to be introduced as a spacer is introduced in the porous base matrix is not particularly limited, but the time is preferably not less than 0.2 hours and not more than 100 hours, more preferably not less than 0.5 hours and not more than 50 hours, further preferably not less than 1 hour and not more than 24 hours, particularly preferably not less than 2 hours and not more than 15 hours, and most preferably not less than 3 hours and not more than 10 hours, in terms of reactivity and from the reason that the damage to the base matrix is little. It is preferable that the reaction time is adjusted according to the reactivity, pH and reaction temperature.

The porous base matrix of the present invention can be obtained by introducing a spacer in the formyl group-containing porous particle and thereafter treating the remaining formyl group of the porous particle which is not used for the reaction.

A method for treating the remaining formyl group of the porous particle which is not used for the reaction after introduction of a spacer in the formyl group-containing porous particle is not particularly limited, and can be exemplified by a method of treatment with a reducing agent, a method of treatment with heat, a method of treatment with an alkali, a method of treatment with a blocking agent and others.

The method of treatment with a reducing agent is not particularly limited; and a method of treatment with a tetrahydroborate such as sodium tetrahydroborate is preferable. A solvent at the time of the reductive treatment is not particularly limited, and water, a commonly used organic solvent such as dimethyl sulfoxide, dimethylformamide and dioxolan, an alcohol such as ethanol, methanol and propanol, and a solvent mixture of two or more of the above solvents.

At the time of the reductive treatment, pH is not particularly limited; however in terms of safety, the pH is preferably not less than 7. Since the damages on the base matrix and the spacer can be reduced, the pH is preferably not more than 12, more preferably not less than 9 and not more than 12, and even more preferably not less than 11 and not more than 12.

The reductive treatment temperature is not particularly limited; and the temperature is preferably not less than 0° C. in terms of advantage in reaction rate, and preferably not more than 100° C. in terms of safety and the damage on the base material and the spacer. The temperature is more preferably not less than 4° C. and not more than 70° C., particularly preferably not less than 10° C. and not more than 50° C., and most preferably not less than 10° C. and not more than 40° C.

The duration time of the reductive treatment is not particularly limited; for the reason that the inactivation of the functional groups and the damage on the base matrix is little, the duration time is preferably not less than 0.01 hours and not more than 50 hours, more preferably not less than 0.1 hours and not more than 25 hours, furthermore preferably not less than 0.25 hours and not more than 10 hours, particularly preferably not less than 0.25 hours and not more than 5 hours, and most preferably not less than 0.5 hours and not more than 2 hours. It is preferable to adjust the duration time in accordance with reactivity, pH and reaction temperature.

The number of times of reductive treatment is not particularly limited; and the number is preferably one or more for the reason that the remaining formyl group of the porous particle which is not used for the reaction after introduction of a spacer in the formyl group-containing porous particle is completely treated. When the number is 20 times or lower, the damages on the base matrix and the spacer can be reduced. The number is more preferably not less than 2 times and not more than 15 times, furthermore preferably not less than 2 times and not more than 10 times, and most preferably not less than 3 times and not more than 7 times.

The concentration of the reducing agent is not particularly limited; and the concentration is preferably not less than 0.0001 M in terms of the efficiency of treatment of the formyl group, and is preferably not more than 2 M in terms of safety. The concentration is more preferably not less than 0.001 M and not more than 1 M, furthermore preferably not less than 0.01 M and not more than 0.5 M, particularly preferably not less than 0.02 M and not more than 0.25 M, and most preferably not less than 0.05 M and not more than 0.1 M.

The method of treatment with heat for the remaining formyl group of the porous particle which is not used for reaction after introduction of a spacer in the formyl group-containing porous particle is not particularly limited; and the temperature is preferably not less than 50° C. in terms of advantage in reaction rate, and is preferably not more than 150° C. in terms of the damages on the base matrix and the spacer. The temperature is more preferably not less than 50° C. and not more than 130° C., and furthermore preferably not less than 80° C. and not more than 130° C.

The pH in the method of treatment with an alkali for the remaining formyl group of the porous particle which is not used for reaction after introduction of a spacer in the formyl group-containing porous particle is not particularly limited; and the pH of not less than 10 is preferable, since efficient treatment can be carried out. Further, the pH of not more than 13 is preferable, since the damages on the porous base matrix and the spacer can be reduced. The pH is more preferably not less than 10 and not more than 12, and particularly preferably not less than 11 and not more than 12.

The method of treatment with a sealing agent for the remaining formyl group of the porous particle which is not used for the reaction after introduction of a spacer in the formyl group-containing porous particle is not particularly limited; and the sealing agent is preferably a low molecular weight compound containing a functional group reactive with an active group of the porous base matrix. The lower the molecular weight of the compound is, the less the steric hindrance is and the more efficiently the sealing reaction is promoted. In particular, a low molecular weight compound having amino group is preferable to be used and the example of such a compound includes lysine, glycine, monoethanolamine, tris(hydroxymethyl)aminomethane and others.

A periodic acid oxidation method may be exemplified as a method for introducing formyl group in a spacer after introduction of the spacer in the porous particle of the present invention.

Periodic acid and/or a periodate capable of being used in the present invention is not particularly limited; and it is preferable that a periodate such as sodium periodate or potassium periodate is reacted to introduce formyl group.

The content of the formyl group in the porous basic matrix according to the present invention is preferably not less than 0.5 µmol and not more than 100 µmol per 1 mL of the porous base matrix. When the content of the formyl group is not less than 0.5 µmol per 1 mL of the porous base matrix, the affinity ligand can be efficiently immobilized and the amount of the target substance to be adsorbed is increased in the case of using such a porous base matrix as an adsorbent. On the other hand, although the reason is not clear, surprisingly, when the content of the formyl group is not more than 100 µmol per 1 mL of the porous base matrix, the amount of the target substance to be adsorbed tends to be increased. Furthermore, in the case where a method for introducing the formyl group by reacting periodic acid and/or a periodate is employed, the strength of the porous base matrix tends to be high when the content of the formyl group is not more than 100 µmol per 1 mL of the porous base matrix.

The content of the formyl group is more preferably in a range of not less than 1 µmol and not more than 50 µmol, furthermore preferably not less than 1 µmol and not more than 25 µmol, particularly preferably not less than 1 µmol and not more than 10 µmol, and most preferably not less than 2 µmol and not more than 7 µmol, per 1 mL of the porous base matrix. The method for adjusting the content of the formyl group is not particularly limited; and the content of the formyl group can be adjusted in accordance with, for example, time, temperature and the concentration of a formylation agent such as periodic acid and/or a periodate in the formyl group introduction reaction.

The measurement of the content of the formyl group can be carried out by adding a phenylhydrazine solution to the formyl group-containing base matrix, stirring the mixture at 40° C. for 1 hour, measuring the absorption spectrum of the supernatant after the reaction with UV, and measuring the amount of phenylhydrazine to be decreased based on the calibration curve of phenylhydrazine to determine the content of the formyl group.

From the result of earnest investigations, the present inventors found that although the reason is not clear, surprisingly, the amount of the target substance to be adsorbed is increased and the amount of a leaching amino group-containing ligand is decreased when the amino group-containing ligand is immobilized on the formyl group-containing base matrix which is obtained by reacting periodic acid or the salt thereof in a solution adjusted the pH in a range of not less than 1 and not more than 6 by adding an acid to obtain a adsorbent, and the finding led to completion of the present invention.

The present invention provides a method for producing an adsorbent by immobilizing an amino group-containing ligand on a formyl group-containing porous base matrix which is obtained by reacting periodic acid and/or the salt thereof in a solution adjusted the pH in a range of not less than 1 and not more than 6 by adding an acid.

The periodate is not particularly limited, and sodium periodate and potassium periodate can be preferably used.

The acid to be used in the present invention is not particularly limited; and an inorganic acid such as hydrochloric acid, sulfuric acid and nitric acid and the salts thereof may be used. An organic acid such as citric acid, acetic acid, tartaric acid, phthalic acid, fumaric acid, oleic acid, lactic acid, lauric acid and the salts thereof are more preferable, since when an organic acid is used, the pH buffering effect of the reaction mixture can be obtained.

The range of pH for the reaction of the above-mentioned periodic acid or the salt thereof is preferably not less than 2 and not more than 5, more preferably not less than 2 and not more than 4.5, and particularly preferably not less than 2 and not more than 4.

The concentration of the above-mentioned periodic acid or the salt thereof is preferably not less than 5 mM and not more than 300 mM. When the concentration is not less than 5 mM, the formyl group is easily introduced in the base matrix, and when the concentration is not more than 300 mM, the strength of the porous base matrix becomes difficult to be lowered. The concentration of the periodic acid or the salt thereof is more preferably not less than 5 mM and not more than 250 mM, and furthermore preferably not less than 5 mM and not more than 150 mM.

From the result of earnest investigations, surprisingly, the present inventors found that a method for producing an adsorbent by immobilizing an amino group-containing ligand on a formyl group-containing porous base matrix obtained by reacting periodic acid and/or a periodate at a temperature of not less than 0° C. and not more than 10° C. gives an adsorbent with an increased amount of the target substance to be adsorbed. The temperature is more preferably not less than 0° C. and not more than 8° C.

The raw material of the porous base matrix of the present invention is not particularly limited; but can be, for example, a polysaccharide, polystyrene, a styrene-divinylbenzene copolymer, a polyacrylamide, a poly(acrylic acid), a poly (methacrylic acid), a poly(acrylic ester), a poly(methacrylic ester), a polyvinyl alcohol, derivatives thereof and the like. The raw materials may have a coating layer of, for example, a polymer material having a hydroxy group, such as hydroxyethyl methacrylate, or a graft copolymer obtained by copolymerizing a monomer having a poly(ethylene oxide) chain with another polymerizable monomer. In particular, a polysaccharide, poly(vinyl alcohol) and the like can be preferably used since it becomes easy to introduce active groups in the base matrix surface.

It is more preferable that the porous base matrix of the present invention contains a polysaccharide. A polysaccharide is preferable due to being easily industrially obtained and having high safety to organisms. A polysaccharide able to be used in the porous base matrix of the present invention is not particularly limited; but can be, for example, agarose, cellulose, dextrin, chitosan, chitin, derivatives thereof and the like.

It is more preferable that the porous base matrix of the present invention contains cellulose and/or a cellulose derivative. The porous base matrix containing cellulose or a cellulose derivative is preferred, since such a porous base matrix has relatively high mechanical strength, is hardly damaged and particulated due to toughness, and is relatively difficult to be suffered from compaction even when flushed with a liquid at high speed in case of being charged in a column. In addition, cellulose is most preferred as the raw material for the porous base matrix of the present invention in terms of strength and cost.

Porous base matrix is widely used as adsorbents for a variety of chromatographic methods and affinity adsorbents, including medical adsorbents for treatment. Specifically, in the field of antibody drug purification, upscaling and increased linear speed is being actively carried out as a result of a significant increase in the antibody drug market. With the upscaling and increased linear speed of purification, a need has arisen for the strength of adsorbent, that is porous base matrix or porous particle, used in the purification to increase in some cases. Method for increasing the strength of porous base matrix or porous particle is not particularly limited, and methods such as increasing the matrix content (for example, the resin content) of the porous base matrix or porous particle are preferred, but increasing the strength of the porous base matrix or porous particle by using a crosslinking agent is more preferred due to the advantage of being difficult for the diameter of the pores in the porous base matrix or porous particle to become smaller. In other words, it is preferable for the porous base matrix or porous particle of the present invention to be crosslinked.

The crosslinking agent and crosslinking condition are not particularly limited, and publicly known technologies can be used. For example, it is possible to carry out the crosslinking by using at least one halohydrin, such as epichlorohydrin, epibromohydrin and dichlorohydrin, or bifunctional or higher-functional epoxy compound, such as resorcinol diglycidyl ether, neopentylglycol diglycidyl ether, 1,6-hexanediol diglycidyl ether, hydrogenated bisphenol A diglycidyl ether, glycerol diglycidyl ether, trimethylolpropane diglycidyl ether, diglycidyl terephthalate, diglycidyl ortho-phthalate, ethylene glycol diglycidyl ether, diethylene glycol diglycidyl ether and propylene glycol diglycidyl ether.

The method for increasing the strength of the porous base matrix or porous particle by using the crosslinking agent is not particularly limited, but it is preferable that the crosslinking agent is allowed to act on the base matrix under alkaline condition in terms of reaction efficiency. The method for charging the crosslinking agent is not particularly limited, and the entire use amount thereof may be added at the start of the reaction, the divided quantities may be charged into multiple times and the reactions are repeated, the crosslinking agent may be charged in small portions using an addition funnel and the like, or the porous base matrix may be charged in a reaction vessel in which the crosslinking agent is charged.

The solvent to be used when the crosslinking reaction is carried out is not particularly limited; and water, commonly used organic solvents such as dimethyl sulfoxide, dimethyl formamide and dioxolane, alcohols such as ethanol, methanol and propanol, or a mixed solvent of two or more thereof can be used. In addition, it is preferable to carry out the reaction in the presence of a reducing agent such as sodium borohydride in order to increase the reaction efficiency.

The temperature during the crosslinking reaction is not particularly limited; but the temperature is preferably not less than 0° C. due to being advantageous in terms of the reaction rate and/or is preferably not more than 100° C. in terms of safety and damage to the porous base matrix or the porous particle, and more preferably not more than 70° C. since it is difficult to lose the activity of the functional groups.

It is preferable that the crosslinking reaction is carried out under stirring or shaking, and the number of revolution or vibration per minute is not particularly limited, but the number is preferably not less than 1 and not more than 1000 since uniform stirring is possible and for reasons such as not causing physical damage to the porous base matrix or the porous particle, more preferably not less than 10 and not more than 500, further preferably not less than 30 and not more than 300, particularly preferably not less than 50 and not more than 200, most preferably not less than 75 and not more than 150. It is preferable to adjust the stirring rate according to the differences in the specific gravities of the raw materials and the strength of the porous base matrix or the porous particle.

The crosslinking reaction time is not particularly limited, but the reaction time is preferably not less than 1 hour and not more than 8 hours when a halohydrin is used in terms of loss of activity of the functional groups and damage to the base matrix, and preferably not less than 1 hour and less than 15 hours when a bifunctional or higher-functional epoxy compound is used. It is more preferably to adjust the reaction time according to the reactivity of the crosslinking agent, the pH or the reaction temperature.

In the present invention, it is preferable that an amino group-containing ligand is immobilized on the formyl group-containing base matrix in an aqueous solution containing one or more kinds of compounds in which a carboxylate is selected as an indispensable component from the group consisting of a carboxylate, a metal halide and a sulfate.

The carboxylate is not particularly limited, and for example, sodium acetate, sodium lactate, calcium lactate, sodium citrate, potassium hydrogen tartrate, potassium oleate, sodium laurate, sodium phthalate, potassium phthalate, sodium fumarate, potassium fumarate, sodium tartrate, potassium tartrate and others can be used, and sodium citrate is particularly preferable.

The concentration of the carboxylate in the aqueous solution is not particularly limited; and the concentration is preferably not less than 0.01 M and not more than 5 M. When the concentration is not less than 0.01 M, the amount of the ligand to be immobilized tends to be increased, and the concentration of not more than 5 M is preferable in terms of the production cost. The concentration of the carboxylate in the aqueous solution is more preferably not less than 0.05 M and not more than 3 M, furthermore preferably not less than 0.1 M and not more than 1.5 M, particularly preferably not less than 0.25 M and not more than 1 M, and most preferably not less than 0.4 M and not more than 0.8 M.

The metal halide is not particularly limited; and, for example, lithium chloride, sodium chloride, potassium chloride, calcium chloride, magnesium chloride and others can be preferably used. The concentration of the metal halide in the aqueous solution is not particularly limited; and the concentration is preferably not less than 0.001 M and not more than 1 M. The concentration of not less than 0.005 M is preferable, since the amount of the target substance to be absorbed is increased, and the concentration of not more than 1 M is preferable in terms of the production cost. The concentration of the metal halide in the aqueous solution is more preferably not less than 0.01 M and not more than 0.75 M, furthermore preferably not less than 0.05 M and not more than 0.5 M, and particularly preferably not less than 0.075 M and not more than 0.5 M.

As a furthermore preferable embodiment of the present invention, the present inventors found that when an amino group-containing ligand is immobilized on the formyl group-containing base matrix in a reaction mixture containing a citrate and/or a sulfate, the amount and/or the ratio of the amino group-containing ligand to be immobilized is increased as compared with that in the case of using a reaction solution mixture no citrate and/or no sulfate. The finding can be employed preferably in the present invention.

The citrate or the sulfate to be used in the present invention is not particularly limited, and examples of the citrate may include a mono-alkali metal citrate such as monosodium citrate and monopotassium citrate, a di-alkali metal citrate such as disodium citrate and dipotassium citrate, a tri-alkali metal citrate such as trisodium citrate and tripotassium citrate, monoiron sodium citrate, iron citrate, iron ammonium citrate, calcium citrate, isocitric acid and the salts thereof. One or more of the citrates may be used, and further the compounds of which form is hydrate and anhydride may be used.

As the sulfate, for example, an alkali metal sulfate such as lithium sulfate, sodium sulfate and potassium sulfate can be used, and further the compounds of which form is hydrate and anhydride may be used.

The reaction mixture containing a citrate and/or a sulfate may contain other substance, and the other substance can be exemplified by sodium chloride, potassium chloride, carbonates, phosphates, acetic acid, an acetate such as sodium acetate, an amine such as triethylamine and others.

In the production method of the present invention, the concentration of a citrate and/or a sulfate in the reaction mixture is not particularly limited, and the concentration is preferably not less than 0.01 M and not more than 2 M. The concentration of the citrate and/or the sulfate of not less than 0.01 M is preferable, since the amount and/or the ratio of the ligand to be immobilized is increased. The concentration of the citrate and/or the sulfate of not more than 2 M is preferable, since the cost is lowered and the viscosity of the reaction mixture becomes low. The concentration of the citrate and/or the sulfate is more preferably not less than 0.05 M and not more than 1.9 M, furthermore preferably not less than 0.1 M and not more than 1.7 M, particularly preferably not less than 0.25 M and not more than 1.5 M, and most preferably not less than 0.4 M and not more than 1 M.

The concentration of the other substance to be contained in the reaction mixture containing a citrate and/or a sulfate is not also particularly limited, and the concentration is preferably not less than 0.001 M and not more than 1 M. The concentration of the other substance of not less than 0.001 M is preferable, since the various properties of the adsorbent are improved. Further, the concentration of the other substance of not more than 1 M is preferable, since the cost is lowered, the viscosity of the reaction mixture becomes low, and the effect of the citrate and/or the sulfate tends to be easily obtained. The concentration of the other substance is more preferably not less than 0.005 M and not more than 0.7 M, furthermore preferably not less than 0.01 M and not more than 0.5 M, particularly preferably not less than 0.05 M and not more than 0.5 M, and most preferably not less than 0.1 M and not more than 0.25 M.

In the production method of the present invention, the pH in the reaction mixture is not particularly limited, and the pH is preferably not less than 7 and not more than 13. The pH of the reaction mixture of not less than 7 is preferable, since the amount and/or the ratio of the ligand to be immobilized is increased. The pH of the reaction mixture of not more than 13 is preferable, since the damages on the base material of the adsorbent and on the ligand is little.

It is preferable that the amino group-containing ligand is immobilized on the formyl group-containing porous base matrix in the reaction mixture having a pH of not less than 11.5 and less than 13.0, since the amount and/or the ratio of the amino group-containing ligand to be immobilized is further increased. The pH is more preferably not less than 11.5 and less than 12.6, particularly preferably not less than 11.5 and less than 12.3, and most preferably not less than 11.6 and less than 12.1. The pH can be measured by using a pH meter subjected to 3-point calibration using standard solutions each having a pH of from 3 to 5, from 6 to 7 and from 9 to 10.

From the result of earnest investigations, surprisingly, the present inventors also found that when stabilization procedure is carried out after imination reaction in immobilization of an amino group-containing ligand on the formyl group-containing base matrix in two-step reactions of the imination reaction and reductive reaction thereof, the amount of the target substance to be adsorbed when the porous base matrix is used as an adsorbent is increased, compared with that in the case where no stabilization procedure is carried out.

The present invention also provides a method for producing an adsorbent by carrying out stabilization procedure after imination reaction in immobilization of an amino group-containing ligand on the formyl group-containing porous base matrix in two-step reactions of the imination reaction and reductive reaction thereof.

The stabilization procedure after imination reaction in the present invention refers to adjusting pH of the reaction mixture within ±1 of the pH during the reductive reaction after the imination reaction and thereafter stirring, shaking or leaving the reaction mixture without adding a reducing agent.

The duration time of the stabilization procedure is not particularly limited, and the duration time is preferably not less than 1 hour and not more than 48 hours. The stabilization duration time of not less than 1 hour is preferable, since the amount of the target substance to be adsorbed by the adsorbent is increased, and the stabilization duration time of not more than 48 hours is preferable in terms of the production cost. The stabilization duration time is more preferably not less than 1 hour and not more than 24 hours, furthermore preferably not less than 1 hour and not more than 15 hours, and particularly preferably not less than 2 hours and not more than 15 hours.

The stabilization procedure after the imination reaction is preferably carried out at a pH of not less than 2 and not more than 10. The pH of not less than 2 in stabilization procedure is preferable in terms of the durability and safety of a production apparatus, and the pH of not more than 10 is preferable, since the amount of the target substance to be adsorbed by the adsorbent is increased. The pH in the stabilization procedure is more preferably not less than 2 and not more than 9, and furthermore preferably not less than 2 and not more than 8.

It is preferable that the imination reaction, stabilization procedure and reductive reaction in the present invention are carried out in a buffer solution in terms of the stability of pH. The buffer solution to be used in the present invention is not particularly limited, and a conventionally known buffer solution can be used preferably.

It is preferable that the buffer solution contains one or more kinds of salts capable of having an anion with di- or more valence. Although the reason is not clear, when the imination reaction, stabilization procedure and reductive reaction of the present invention are carried out in a buffer solution containing one or more kinds of salts capable of having an anion with di- or more valence, surprisingly, the amount of the amino group-containing ligand to be immobilized is more increased. The salt capable of having an anion with di- or more valence is not particularly limited, and a polycarboxylate such as a citrate, an oxalate, a phthalate, a succinate, a malate and an ethylenediamine tetraacetate; a phosphate, a sulfate, a carbonate and others can be used.

The concentration of the salt capable of having an anion with di- or more valence in the buffer solution is not particularly limited, and the concentration is preferably not less than 0.01 M and not more than 5 M. The concentration of not less than 0.01 M is preferable, since the amount of the ligand to be immobilized tends to be increased, and the concentration of not more than 5 M is preferable in terms of the production cast. The concentration in an aqueous solution of the carboxylate is more preferably not less than 0.05 M and not more than 3 M, furthermore preferably not less than 0.1 M and not more than 1.5 M, particularly preferably not less than 0.25 M and not more than 1 M, and most preferably not less than 0.4 M and not more than 0.8 M.

It is more preferable that the buffer solution contains a polycarboxylate and/or a neutral salt. The neutral salt is not particularly limited, and the example thereof includes sodium sulfate, sodium chloride, sodium nitrate, potassium chloride, lithium chloride, magnesium chloride, calcium chloride and others.

It is furthermore preferable that the buffer solution contains a citrate. The citrate is not particularly limited, and the example thereof includes sodium citrate, potassium citrate, lithium citrate and others.

It is preferable that the buffer solution containing a citrate contains at least one or more kinds of a metal halide and a sulfate. The metal halide is not particularly limited, and lithium chloride, sodium chloride, potassium chloride, calcium chloride, magnesium chloride and others can be preferably used. The concentration of the metal halide and/or the sulfate in the buffer solution is not particularly limited, and the concentration is preferably not less than 0.001 M and not more than 1 M. The concentration of not less than 0.001 M is preferable, since the amount of the target substance to be adsorbed is increased, and the concentration of not more than 1 M is preferable in terms of the production cost. The concentration is more preferably not less than 0.01 M and not more than 0.5 M, furthermore preferably not less than 0.05 M and not more than 0.75 M, particularly preferably not less than 0.075 M and not more than 0.5 M, and most preferably not less than 0.1 M and not more than 0.3 M.

The present inventors also found that when the immobilization bond of the ligand is stabilized and simultaneously the excess formyl group is inactivated at using an organic borane complex in the case of immobilization of an amino group-containing ligand on the formyl group-containing base matrix, surprisingly, the amount of the target substance to be adsorbed by the adsorbent is increased.

The present invention also relates to a method for producing an adsorbent, characterized in the steps of stabilizing the immobilization bond of the ligand and simultaneously inactivating the excess formyl group by an organic borane complex in the case of immobilization of an amino group-containing ligand on the formyl group-containing base matrix. The excess formyl group refers to the remaining formyl group of the porous base matrix which is not used for immobilization of the amino group-containing ligand. If the excess formyl group is not inactivated, nonspecific adsorption may be caused in some cases when the porous base matrix is used as an adsorbent.

In the present invention, although an organic borane complex which is used generally as a relatively weak reducing agent is used, the excess formyl group can be inactivated without using an amino group-containing low molecular weight compound, such as monoethanolamine, glycine and tris(hydroxymethyl)aminomethane, which is used generally as an inactivation agent at the time of using a weak reducing agent, so-called a blocking agent.

It is preferable that the procedure of inactivation of the excess formyl group and simultaneously the stabilization of the immobilization bond of the ligand by the organic borane complex is carried out in the reaction mixture containing a carboxylate, since the stabilization of the immobilization bond of the ligand and the inactivation of the excess formyl group are further promoted.

The carboxylate which can be used in the present invention is not particularly limited, and can be exemplified by an acetate, a tartrate, a citrate, an oxalate, a phthalate, a succinate, a malate, an ethylenediamine tetraacetate and others. The cation for the examples is not particularly limited, and lithium, sodium, potassium, magnesium, calcium and others can be used. In particular, a citrate and particularly an alkali metal salt of citric acid is preferably used in terms of the cost. The concentration of the carboxylate in the reaction mixture is not particularly limited; and the concentration of not less than 0.01 M is preferable in terms of the stabilization of the immobilization bond of the ligand and from the reason that the inactivation of the excess formyl group is further promoted. Also, the concentration of the carboxylate of not more than 2 M is preferable, since the cost is lowered and the viscosity of the reaction mixture becomes low and in terms of the operability. The concentration of the carboxylate is more preferably not less than 0.05 M and not more than 1.9 M, furthermore preferably not less than 0.1 M and not more than 1.7 M, particularly preferably not less than 0.25 M and not more than 1.5 M, and most preferably not less than 0.4 M and not more than 1 M.

The reaction mixture may contain a substance other than the carboxylate, and, for example, one or more kinds of compounds among metal halide and sulfate are preferably contained. The metal halide is not particularly limited, and lithium chloride, sodium chloride, potassium chloride, calcium chloride, magnesium chloride and others can be preferably used. The concentration of the metal halide and/or the sulfate in the buffer solution is not particularly limited, and the concentration is preferably not less than 0.001 M and not more than 1 M. The concentration of not less than 0.001 M is preferable, since the amount of the target substance to be absorbed is increased, and the concentration of not more than 1 M is preferable in terms of the cost. The concentration is more preferably not less than 0.01 M and not more than 0.5 M, furthermore preferably not less than 0.05 M and not more than 0.75 M, particularly preferably not less than 0.075 M and not more than 0.5 M, and most preferably not less than 0.1 M and not more than 0.3 M.

The procedure of inactivation of the excess formyl group simultaneously with the stabilization of the immobilization bond of the ligand by an organic borane complex is preferably carried out for not less than 1 hour and not more than 48 hours. It is preferable to carry out the procedure for not less than 1 hour, since the stabilization of the immobilization bond of the ligand and the inactivation of the excess formyl group are further promoted, and it is preferable to carry out the procedure not more than 48 hours in terms of the production cost. The operation duration time is more preferably not less than 2 hours and not more than 24 hours, furthermore preferably not less than 3 hours and not more than 20 hours, particularly preferably not less than 4 hours and not more than 15 hours, and most preferably not less than 5 hours and not more than 10 hours.

The organic borane complex which can be used in the present invention is not particularly limited, and an aminoborane complex containing aminoborane is preferable as the organic borane complex, since the inactivation of the excess formyl group surprisingly tends to be promoted although the reason is not clear. Such an aminoborane complex which can be used in the present invention is not particularly limited, and can be exemplified by 4-(dimethylamino)pyridine borane, N-ethyldiisopropylamine borane, N-ethylmorpholine borane, N-methylmorpholine borane, N-phenylmorpholine borane, lutidine borane, triethylamine borane; or, trimethylamine borane, 4-(dimethylamine)pyridine borane, N-ethyldisopropylamine borane, N-ethylmorpholine borane, N-methylmorpholine borane, N-phenylmorpholine borane, lutidine borane, ammonia borane, dimethylamine borane, pyridine borane, 4-methylpyridine borane, N,N-diethylaniline borane, N,N-diisopropylethylamine borane, 2,6-lutidine borane, borane amine, trisdimethylaminoborane, trimethylaminoborane, borazine, 1,3,5-trimethylborazine, 2,4,6-trimethylborazine, hexamethylborazine and others.

In particular, dimethylamine borane is preferable, in terms of the solubility and safety in the reaction mixture.

The temperature of the imination reaction, stabilization procedure and reductive reaction in the present invention is preferably not less than −10° C. and not more than 40° C. The temperature of not less than −10° C. is preferable in terms of the fluidity of the reaction mixture, and the temperature of not more than 40° C. is preferable, since the affinity ligand and the formyl group of the porous base matrix are hardly inactivated. The temperature is more preferably not less than −5° C. and not more than 35° C., and furthermore preferably not less than 0° C. and not more than 30° C.

The amount of affinity ligand to be introduced in the adsorbent of the present invention is preferably not less than 1 mg and not more than 500 mg per 1 mL of the porous base matrix. The amount of affinity ligand to be introduced is preferably not less than 1 mg per 1 mL of the porous base matrix in terms of increasing the amount of target substance to be adsorbed, and is preferably not more than 500 mg in terms of limiting production cost. The amount of affinity ligand to be introduced is more preferably not less than 2 mg and not more than 120 mg, further preferably not less than 3 mg and not more than 60 mg, particularly preferably not less than 4 mg and not more than 30 mg, and most preferably not less than 4 mg and not more than 15 mg, per 1 mL of the porous base matrix.

The amount of affinity ligand to be introduced in the adsorbent of the present invention is preferably not less than 0.01 μmol and not more than 15 μmol per 1 mL of the porous base matrix. The amount of affinity ligand to be introduced is preferably not less than 0.01 μmol per 1 mL of the porous base matrix, since the amount of the target substance to be adsorbed is increased, and is preferably not more than 15 μmol in terms of limiting production cost. The amount of affinity ligand to be introduced is more preferably not less than 0.03 μmol and not more than 5 μmol, further preferably not less than 0.05 μmol and not more than 2 μmol, particularly preferably not less than 0.1 μmol and not more than 0.75 μmol, and most preferably not less than 0.1 μmol and not more than 0.5 μmol, per 1 mL of the porous base matrix.

The amount of affinity ligand to be introduced can be obtained by measuring the absorbance from the affinity ligand in the supernatant of the reaction mixture after the immobilization reaction. In addition, the introduced amount of affinity ligand can be obtained by elemental analysis. For example, in the case of an amino group-containing affinity ligand, it is possible to measure the introduced amount of affinity ligand by subjecting the adsorbent to nitrogen content analysis.

An affinity ligand used in medical adsorbents for treatment, adsorbents for purifying antibody drugs and the like is not particularly limited; but can be, for example, an antigen or protein having high specificity for an antibody, protein G and protein L and the variant thereof, or a peptide having antibody binding activity. In particular, attention has been focused on adsorbents obtained by immobilizing protein A as an affinity ligand on a base matrix as adsorbents able to specifically adsorb and release immunoglobulin (IgG) and the like. Attention has been focused on adsorbents obtained by immobilizing protein A as adsorbents for the treatment of rheumatism, hemophilia and dilated cardiomyopathy. In addition, adsorbents that enable the purification of antibodies such as IgG to be carried out on a large scale, at high speed and at low cost are needed in the field of antibody drug purification. From the perspective, the adsorbent of the present invention is preferably one obtained by introducing protein A as an affinity ligand.

The protein A able to be used in the present invention is not particularly limited, and it is possible to use a natural product or a genetically modified product without limitation. In addition, a protein that contains an antibody binding domain or a variant thereof or a fusion protein can be used as the protein A. In addition, it is possible to use a protein A produced from a bacterial extract or culture supernatant by combining and/or repeating purification methods selected from among chromatography methods such as ion exchange chromatography, hydrophobic interaction chromatography, gel filtration chromatography and hydroxyapatite chromatography and methods such as molecular weight fractionation and fractional precipitation that use membrane separation technologies. In particular, protein A obtained using the methods disclosed in PCT Publication No. WO 2006/004067 or U.S. Pat. No. 5,151,350 is preferred.

For the adsorbent of the present invention, the average concentration of the ligand leaked from the adsorbent into the target substance in the first purification to the third purification is preferably not more than 50 ppm. When the average concentration of the ligand leaked from the adsorbent into the target substance in the first purification to the third purification is not more than 50 ppm, it is possible to improve safety during treatment and purification, to further improve the purity of the target substance, and to reduce the complexity of subsequent steps in the purification. The concentration of the ligand leaked into the target substance is more preferably not less than 0 ppm and not more than 40 ppm, further preferably not less than 0 ppm and not more than 30 ppm, particularly preferably not less than 0 ppm and not more than 25 ppm, and most preferably not less than 0 ppm and not more than 20 ppm. The concentration of the ligand leaked into the target substance can be obtained using the method disclosed by Steindl F. et al., Journal of Immunological Methods, vol. 235 (2000), pp. 61-69.

In order to further reduce the quantity of the leaching affinity ligand in the adsorbent of the present invention, it is preferable to wash the adsorbent. The washing agent and washing method are not particularly limited, but stirring after passing or injecting a solution containing at least one of washing agent such as water, acetic acid, an alcohol, an organic solvent, a liquid having pH of 2-5, a liquid having pH of 8-13, sodium chloride, potassium chloride, sodium acetate, disodium hydrogen phosphate, sodium dihydrogen phosphate, a buffering agent, a surfactant, urea, guanidine, guanidine hydrochloride or another reconstituent is preferred. In addition, it is preferable to carry out washing procedure more than once using the same or different solutions, since the quantity of leaching ligand is further reduced.

The quantity of the target substance adsorbed onto the adsorbent of the present invention is preferably not less than 1 mg per 1 mL of the adsorbent. The quantity of the target substance adsorbed onto the adsorbent of the present invention is preferably not less than 1 mg relative to 1 mL of the adsorbent, since the purification can be efficiently carried out. In addition, the quantity of the target substance adsorbed onto the adsorbent of the present invention is preferably not more than 100 mg per 1 mL of the adsorbent, since it becomes easy to elute the adsorbed target substance from the adsorbent. The quantity of the target substance adsorbed onto the adsorbent is more preferably not less than 5 mg and not more than 90 mg, further preferably not less than 10 mg and not more than 80 mg, particularly preferably not less than 20 mg and not more than 70 mg, and most preferably not less than 30 mg and not more than 60 mg, per 1 mL of the adsorbent.

The quantity of the target substance to be absorbed can be obtained as the following method. The method for measuring the quantity of the target substance to be absorbed is not limited, and the quantity can be measured with a static adsorbed quantity and a dynamic binding capacity. For example, a static adsorbed quantity is measured by bringing 0.5 mL of the adsorbent which is substituted with a pH 7.4 phosphate buffer manufactured by Sigma into contact with a solution obtained by dissolving 70 mg of the target substance in 35 mL of a pH 7.4 phosphate buffer manufactured by Sigma, stirring the mixture at 25° C. for 2 hours, and then measuring reduction in the quantity of the target substance in the supernatant.

The adsorbent of the present invention preferably has a compressive stress of not less than 0.01 MPa and not more than 1 MPa when compressed by 5%, a compressive stress of not less than 0.03 MPa and not more than 3 MPa when compressed by 10%, and a compressive stress of not less than 0.06 MPa and not more than 5 MPa when compressed by 15%.

When the adsorbent has a compressive stress of not less than 0.01 MPa when compressed by 5%, a compressive stress of not less than 0.03 MPa when compressed by 10% and a compressive stress of not less than 0.06 MPa when compressed by 15%, such an adsorbent does not suffer from compaction even when a liquid is passed through at a high linear speed. In addition, in a case where the adsorbent of the present invention preferably has a compressive stress of not more than 1 MPa when compressed by 5%, a compressive stress of not more than 3 MPa when compressed by 10% and a compressive stress of not more than 5 MPa when compressed by 15%, it is possible to reduce the brittleness of the adsorbent and inhibit the generation of fine particles.

The adsorbent of the present invention more preferably has a compressive stress of not less than 0.02 MPa and not more than 1 MPa when compressed by 5%, a compressive stress of not less than 0.06 MPa and not more than 3 MPa when compressed by 10%, and a compressive stress of not less than 0.09 MPa and not more than 5 MPa when compressed by 15%. The adsorbent of the present invention most preferably has a compressive stress of not less than 0.04 MPa and not more than 1 MPa when compressed by 5%, a compressive stress of not less than 0.08 MPa and not more than 3 MPa when compressed by 10%, and a compressive stress of not less than 0.11 MPa and not more than 5 MPa when compressed by 15%.

In the present invention, the compressive stress when compressed by 5% means the stress when the adsorbent is compressed so that the volume thereof is reduced by 5% compared to the initial volume, the compressive stress when compressed by 10% means the stress when the adsorbent is compressed so that the volume thereof is reduced by 10% compared to the initial volume, and the compressive stress when compressed by 15% means the stress when the adsorbent is compressed so that the volume thereof is reduced by 15% compared to the initial volume. The initial volume means the volume of the adsorbent charged under settling until the volume of the adsorbent cannot be reduced any further by agitating a slurry that contains the adsorbent.

The resin content of the adsorbent of the present invention per the filled volume is not particularly limited, and is preferably not less than 2% and not more than 50%. When the resin content per the filled volume is not less than 2%, it is possible to obtain the adsorbent that does not suffer from compaction even if used for purification on a large scale and at high linear speed. When the resin content per the filled volume is not more than 50%, it is possible to ensure there are sufficient pores to allow the purification target substance to pass through. The resin content per the filled volume is more preferably not less than 3% and not more than 25%, and further preferably not less than 4% and not more than 15%.

The resin content per the filled volume can be measured by charging and precipitating the porous base matrix until the volume thereof cannot be further reduced so that the volume thereof is adjusted to 1 mL, drying the base matrix at 105° C. for 12 hours, and calculating the dry weight percentage per 1 mL of the gel from the dry weight (g) of 1 mL of the gel. The dry weight percentage corresponds to resin content.

The volume average particle diameter of the adsorbent of the present invention is preferably not less than 20 μm and not more than 1000 μm. The volume average particle diameter of the porous base matrix is preferably not less than 20 μm in terms of preventing compaction, and is preferably not more than 1000 μm in terms of increasing the adsorbed amount of target substance when the adsorbent is used. The volume average particle diameter of the porous base matrix is more preferably not less than 30 μm and not more than 250 μm, further preferably not less than 40 μm and not more than 125 μm, particularly preferably not less than 50 μm and not more than 100 μm, and most preferably not less than 60 μm and not more than 85 μm. The volume average particle diameter can be obtained by measuring the diameters of 100 particles of the porous base matrix selected at random. The diameters of the individual porous base matrix particles can be measured by taking microphotographs of the individual particles, storing the electronic data of the microphotographs, and then using particle diameter measurement software (Image-Pro Plus, produced by Media Cybernetics).

The adsorbent of the present invention and/or the adsorbent produced by the production method of the present invention can be used in the purification of a target substance by affinity chromatography, in purification methods such as those disclosed in Non-patent Document 3 or in medical adsorbents for treatment. The purification methods and treatment methods are not particularly limited, and the adsorbent of the present invention can be suitably used in the methods disclosed in Non-patent Documents 1, 2 and 3 and other publicly known methods.

The adsorbent of the present invention enables the purification of a target substance on a large scale, at high speed and at low cost. In the purification using the adsorbent of the present invention, a column having a diameter of not less than 0.5 cm and a height of not less than 3 cm is preferably used. When the diameter is not less than 0.5 cm and the height is not less than 3 cm, it is possible to carry out the purification or treatment efficiently. In addition, the column preferably has a diameter of not more than 2000 cm and a height of not more than 5000 cm in terms of precision and efficiency of the purification or treatment.

The column more preferably has a diameter of not less than 2 cm and not more than 200 cm and a height of not less than 5 cm and not more than 300 cm, further preferably has a diameter of not less than 5 cm and not more than 100 cm and a height of not less than 8 cm and not more than 150 cm, particularly preferably has a diameter of not less than 10 cm and not more than 85 cm and a height of not less than 12 cm and not more than 85 cm, and most preferably has a diameter of not less than 20 cm and not more than 85 cm and a height of not less than 14 cm and not more than 35 cm.

Treatment or purification in which the adsorbent of the present invention is used preferably has a step in which a liquid is passed at a linear speed of not less than 100 cm/h.

It is preferable to have a step in which a liquid is passed at a linear speed of not less than 100 cm/h in terms of enabling the treatment or purification to be carried out efficiently. In addition, treatment or purification in which the adsorbent of the present invention is used is preferably carried out at a linear speed of not more than 1000 cm/h in terms of precision of the treatment or purification and durability of the apparatus. The linear speed during purification is more preferably not less than 150 cm/h and not more than 800 cm/h, further preferably not less than 250 cm/h and not more than 750 cm/h, particularly preferably not less than 300 cm/h and not more than 700 cm/h, and most preferably not less than 350 cm/h and not more than 700 cm/h.

According to the porous base matrix of the present invention, the adsorbent produced using the porous base matrix, production methods thereof, and purification method using the porous base matrix and the adsorbent, purification can be carried out safely at high speed, and a purified product having high purity and safety can be provided in comparison with cases where the present invention is not used.

EXAMPLES

Hereinafter, the examples of the present invention are described, but the present invention is in no way limited by the examples. The volume of the porous particle and the porous base matrix for reaction means the gravity settled volume unless otherwise specified. The gravity settled volume is obtained by placing a slurry of the porous base matrix and RO water in a weighing apparatus and allowing to stand for 2 hours in a vibration-free state until the volume could not be further reduced. In addition, unless otherwise specified, the volume of the porous base matrix when the functional group content is measured is the volume when a slurry of the porous base matrix and RO water is placed in a weighing apparatus and allowed to settle under vibration until the volume could not be further reduced.

Measurement of Content of Formyl Group

The content of formyl group was obtained by bringing 2 mL of a porous base matrix or porous particle substituted with a 0.1 M phosphate buffer having pH 8 and 2 mL of a 0.1 M phosphate buffer having pH 8 containing dissolved phenylhydrazine into contact with each other, stirring the resulting mixture at 40° C. for 1 hour, measuring the absorbance of the supernatant of the mixture at the maximum absorption around 278 nm by UV measurement, and estimating the quantity of phenylhydrazine to be adsorbed onto the porous base matrix or porous particle. At that time, the quantity by mole of phenylhydrazine to be loaded was controlled to be 3 times as much as the content of the assumed formyl group, and when the quantity of phenylhydrazine to be adsorbed onto the porous base matrix or porous particle was not more than 15% or not less than 45% relative to the quantity of phenylhydrazine to be loaded, the quantity of phenylhydrazine to be loaded was re-examined and the measurement was carried out again.

Measurement of Compressive Stress

A slurry containing 50 vol % of a porous particle or an adsorbent was poured in a measuring cylinder with an inner diameter of 15 mm and made of glass. While vibrating the measuring cylinder made of glass, the porous particle or adsorbent was precipitated and packed until the volume of the porous particle or adsorbent was not further decreased and the amount of the porous particle or adsorbent was adjusted to 4 mL by volume. The volume at that time was defined as the initial volume. A piston made of a metal which was processed so as not to cause friction with the inner wall of the measuring cylinder and as to prevent elution of the porous particle or adsorbent was attached to an auto-graph equipped with a load cell for 20 N (EZ-TEST, manufactured by SHIMADZU Corporation). The bottom face of the piston was adjusted at the position corresponding to 120 vol % of the porous particle or adsorbent. The piston was moved downward at a testing rate of 5 mm/minute while preventing bubble generation to compact the porous particle or adsorbent and decrease the volume, and the compressive stress at a desired point was measured.

Quantitative Determination of Quantity of Glucosamine to be Immobilized

Each porous base matrix in an amount of 1 mL was transferred into a glass filter (3G-2, manufactured by TOP), substituted 3 times with a 0.01 N sodium hydroxide solution in an amount of 3 times as much as that of the gel, and washed 6 times with RO water in an amount of 3 times as much as that of the gel. Then, the porous base matrix gel was suction-filtered for drying for 5 minutes, and substituted with acetic acid (manufactured by Wako Pure Chemical Industries, Ltd.). The obtained gel after the substitution was transferred into a 50 mL beaker and diluted up to 30 mL with acetic acid for non-aqueous titration (manufactured by Wako Pure Chemical Industries, Ltd.). The resulting gel was subjected to titration using a potentiometric automatic titration apparatus (AT-610, manufactured by KEM) with 0.004 N perchloric acid/acetic acid which was obtained by dilution of 0.1 M perchloric acid/acetic acid solvent with acetic acid for non-aqueous titration manufactured by Wako Pure Chemical Industries, Ltd., to measure the amount of glucosamine to be immobilized.

Measurement of Dynamic Binding Capacity and Concentration of Leaching Ligand in Target Substance (1) Production of Solutions The respective solutions were produced, and deformed before use:

A solution: phosphate buffer having pH 7.4 (manufactured by Sigma)1;

B solution: 35 mM sodium acetate having pH 3.5, produced from acetic acid, sodium acetate and RO water manufactured by Wako Pure Chemical Industries, Ltd.;

C solution: 1 M acetic acid, produced from acetic acid and RO water manufactured by Wako Pure Chemical Industries, Ltd.;

D solution: a 1 mg/mL human polyclonal IgG solution, produced from Gammagard manufactured by Baxter and A solution;

E solution: 6 M urea;

F solution: a solution obtained by adding 0.2 vol % of a surfactant (polyoxyethylene(20) sorbitan monolaurate, manufactured by Wako Pure Chemical Industries, Ltd.) to A solution;

a neutralization solution: 2 M tris(hydroxymethyl)aminomethane, produced from tris(hydroxymethyl)aminomethane manufactured by Sigma with RO water.

(2) Packing and Preparation

As an apparatus for column chromatography, AKTA explorer 100 (manufactured by GE Healthcare Biosciences) was used, and a 22 μm mesh was attached to a column with a diameter of 0.5 cm and a height of 15 cm, and 3 mL of each adsorbent of the present invention was put in, and an aqueous 20% ethanol solution (produced from ethanol and RO water manufactured by Wako Pure Chemical Industries, Ltd.) was passed at a linear rate of 450 cm/h for 1 hour to pack the adsorbent in the column. A 15 mL tube for sampling was set in a fraction collector, and the neutralization solution was previously put in the sampling tube for collecting the eluate.

(3) Purification of IgG

The A solution in an amount of 9 mL was passed at a linear rate of 300 cm/h and successively, while being monitored by UV, the D solution was passed at a linear rate of 300 cm/h until 10% of IgG was passed through. Then, 30 mL of the A solution was passed at a linear rate of 300 cm/h and 30 mL of the B solution was passed at a linear rate of 300 cm/h to elute IgG. Finally, 9 mL of the C solution was passed at a linear rate of 300 cm/h and 9 mL of the E solution was passed at a linear rate of 300 cm/h. The procedure after the completion of packing of the adsorbent was repeated further two times to measure the IgG quantity in the eluate and the concentration of the leaching ligand in IgG.

Production Example 1

A porous cellulose particle having a volume average particle diameter of 92 μm, a resin content of 6% and an exclusion limit molecular weight of 50,000,000 (CK-A, manufactured by Chisso Corporation) was classified in a wet condition for 2 hours using a mesh of 90 μm (manufactured by NONAKA RIKAKI, wire diameter: 63 μm) and a classifier (300-MM manufactured by TSUTSUI SCIENTIFIC INSTRUMENTS CO., LTD.) to obtain Porous particle A having a volume average particle diameter of 83 μm.

RO water was added to Porous particle A (2.3 L), to make the total volume 2.78 L, and the mixture was transferred into a separable flask. Into the flask, 0.246 L of 4N NaOH (prepared from NaOH manufactured by Wako Pure Chemical Industries, Ltd. and RO water) was added. In addition, sodium borohydride (3.3 g) was added, and the temperature of the mixture was increased to 40° C. in a water tank. A crosslinking agent containing glycerolpolyglycidyl ether (DENACOL EX314 manufactured by Nagase ChemteX Corporation) (1.64 L) was added thereto, and the mixture was stirred at 40° C. for 5 hours. After the reaction, the mixture was suction-filtered and washed with 20 times by volume of RO water on a glass filter (26G-2 manufactured by TOP) to obtain a crosslinked porous particle. The compressive stress of the obtained crosslinked porous particle was 0.020 MPa when compressed by 5%, 0.049 MPa when compressed by 10%, and 0.080 MPa when compressed by 15%.

RO water was added to the obtained crosslinked porous particle, to make the total amount 2 times by volume of the amount of the crosslinked porous particle. The mixture was added into a glass beaker (1 L), and the beaker was sealed with two aluminium foils and heated at 120° C. for 40 minutes using an autoclave (Neoclave for high-pressure sterilization manufactured by SAKURA). After the temperature was cooled to room temperature, the mixture was suction-filtered and washed with RO water of which volume was 5 times relative to the porous particle of on a glass filter (26G-2 manufactured by TOP) to obtain a crosslinked porous particle in which epoxy group was transformed to glyceryl group.

Then RO water was added to 2.3 L of the porous particle treated by autoclave, to make the total volume 2.78 L, and the mixture was transferred into a separable flask. Into the flask, 0.246 L of 4N NaOH (prepared from NaOH manufactured by Wako Pure Chemical Industries, Ltd. and RO water) was added. In addition, sodium borohydride (3.3 g) was added, and the temperature of the mixture was increased to 40° C. in a water tank. A crosslinking agent (DENACOL EX314 manufactured by Nagase ChemteX Corporation) (1.64 L) was added thereto, and the mixture was stirred at 40° C. for 5 hours. After the reaction, the mixture was suction-filtered and washed with RO water of which volume was 20 times relative to the porous particle on a glass filter (26G-2 manufactured by TOP) to obtain a crosslinked porous particle. The compressive stress of the obtained crosslinked porous particle was 0.020 MPa when compressed by 5%, 0.049 MPa when compressed by 10%, and 0.080 MPa when compressed by 15%.

RO water was added to the obtained crosslinked porous particle, to make the total amount 2 times by volume of the amount of the crosslinked porous particle. The mixture was added into a glass beaker (1 L), and the beaker was sealed with two aluminium foils and heated at 120° C. for 40 minutes using an autoclave (Neoclave for high-pressure sterilization manufactured by SAKURA). After the temperature was cooled to room temperature, the mixture was washed with RO water of which volume was 5 times relative to the porous particle on a glass filter (26G-2 manufactured by TOP) to obtain Porous particle B.

Example 1

To the porous Particle B obtained in Production Example 1 (523 mL), RO water was added to make the total volume 784.5 mL, and the mixture was transferred into a 2 L separable flask. The separable flask was immersed in a thermostat bash (Thermostatic water bath T-2S manufactured by THOMAS KAGAKU Co., Ltd.) at 25° C. A 11.5 mg/mL sodium periodate aqueous solution (523 mL) was prepared by dissolving sodium periodate (manufactured by Wako Pure Chemical Industries) in RO water. The solution was added into the separable flask, and the mixture was stirred with rotation number of 120 rpm at 25° C. for 1 hour. After the reaction, the porous particle was washed with RO water on a glass filter (26G-2 manufactured TOP) until the conductivity of the filtrate became not more than 5 $\rho$S/cm. To the obtained porous particle, RO water was added to make the total volume 784.5 mL, and the mixture was transferred into a separable flask. The separable flask was immersed in a thermostat bash (Thermostatic water bath T-2S manufactured by THOMAS KAGAKU Co., Ltd.) at 25° C. A 11.5 mg/mL sodium periodate aqueous solution was prepared by dissolving sodium periodate (manufactured by Wako Pure Chemical Industries) in RO water. The solution (523 mL) was added into the separable flask, and the mixture was stirred using a stirrer (MAZELA Z) with rotation number of 120 rpm at 25° C. for 1 hour. After the reaction, the porous particle was washed with RO water on a glass filter (26G-2 manufactured TOP) until the conductivity of the filtrate became not more than 5 μS/cm, to obtain Porous particle C. The electric conductivity of filtrate of washing was measured using an electric conductivity meter (ECTestr10 pure+ manufactured by EUTECH INSTRUMENTS). The content of formyl group of the obtained Porous particle C was measured by the above-described method; as a result, the content of formyl group was 68 μmol per 1 mL of the Porous particle C.

Then, a separable flask was marked up at the point of 1042 mL, and the obtained Porous particle C (521 mL) was added into the separable flask with RO water. The separable flask was immersed in a thermostat bash (Thermostatic water bath T-2S manufactured by THOMAS KAGAKU Co., Ltd.) with an input-cooler (ADVANTEC TBC120DA), and the reaction mixture was cooled to 15° C. After it was confirmed that the temperature of the reaction mixture became 15° C., fermentative glucosamine K (manufactured by Kyowa Hakko Co., Ltd.) of which volume was 10 times by mole relative to the content of formyl group of the Porous particle C was added, and the pH was adjusted to 11 by adding a sodium hydroxide aqueous solution. While the pH was fine-adjusted to 11 by adding a 4N sodium hydroxide aqueous solution, RO water was added to make the total volume of the reaction mixture 1042 mL. The mixture was stirred with rotation number of 120 rpm at 15° C. for 5 hours.

Then, 2.96 g of sodium borohydride (manufactured by Wako Pure Chemical Industries) was added, and the mixture was stirred for 1 hour. After the reaction, the porous particle was washed on a glass filter (26G-2 manufactured by TOP) using RO water of which volume was 20 times by volume relative to the porous particle. The washed gel was added in a separable flask, and RO water was added to the mark of 1042 mL. Further sodium borohydride (2.96 g) was added, and the mixture was stirred at 25° C. for 1 hour. After the reaction, the porous particle was washed on a glass filter (26G-2 manufactured by TOP) using RO water of which volume was 20 times by volume relative to the gel. The reaction with sodium borohydride at 25° C. for 1 hour was repeated 2 times, and washing was carried out with RO water on a glass filter (26G-2 manufactured TOP) until the conductivity of the filtrate became not more than 5 μS/cm, to obtain glucosaminized porous base matrix.

The amount of glucosamine to be introduced in the porous base matrix was 17 μmol per 1 mL of the porous base matrix. The content of remaining formyl group which could not be treated with a reducing agent after the immobilization of glucosamine per 1 mL of the porous base matrix was 0 μmol.

To the obtained glucosaminized porous base matrix (109 mL), RO water was added to make the total volume 163.5 mL, and the mixture was transferred into a 500 mL separable flask. Into the flask, 11.5 mg/mL of sodium periodate aqueous solution (109 mL) was added, and the mixture was stirred with rotation number of 120 rpm at 25° C. for 1 hour. After the reaction, washing procedure was carried out on a glass filter (26G-2 manufactured by TOP) using RO water until the conductivity of the filtrate became not more than 5 μS/cm, to obtain Formyl group-containing porous base matrix D. The compressive stress of the obtained crosslinked porous base matrix was 0.028 MPa when compressed by 5%, 0.067 MPa when compressed by 10%, and 0.109 MPa when compressed by 15%. The content of formyl group per 1 mL of the Porous base matrix D was 6.2 μmol.

Example 2

To the Porous particle B obtained in Production Example 1 (435 mL), RO water was added to make the total volume 652 mL, and the mixture was transferred into a 2 L separable flask. The separable flask was immersed in a thermostat bash (Thermostatic water bath T-2S manufactured by THOMAS KAGAKU Co., Ltd.) at 25° C. A 46.0 mg/mL sodium periodate aqueous solution (217.5 mL) was prepared by dissolving sodium periodate (manufactured by Wako Pure Chemical Industries) in RO water. The solution (217.5 mL) was added into the separable flask, and the mixture was stirred with rotation number of 120 rpm at 25° C. for 15 minutes. After the reaction, the porous particle was washed with RO water on a glass filter (26G-2 manufactured TOP) until the conductivity of the filtrate became not more than 5 μS/cm, to obtain Porous particle E. The content of formyl group of the obtained Porous particle E was measured; as a result, the content of formyl group per 1 mL of the Porous particle E was 45.6 µmol.

Then, a separable flask was marked up at the point of 820 mL, and the obtained Porous particle E (410 mL) was added into the separable flask with RO water. The separable flask was immersed in a thermostat bash (Thermostatic water bath T-2S manufactured by THOMAS KAGAKU Co., Ltd.) with an input-cooler (ADVANTEC TBC120DA), and the reaction mixture was cooled to 15° C. After it was confirmed that the temperature of the reaction mixture became 15° C., fermentative glucosamine K (manufactured by Kyowa Hakko Co., Ltd.) of which amount was 10 times by mole relative to the content of formyl group of the Porous particle E was added, and the pH was adjusted to 11 by adding a 4N sodium hydroxide aqueous solution (prepared from sodium hydroxide manufactured by Wako Pure Chemical Industries and RO water). While the pH was fine-adjusted to 11 by adding a 4N sodium hydroxide aqueous solution, RO water was added to make the total volume of the reaction mixture 820 mL. The mixture was stirred with rotation number of 120 rpm at 15° C. for 5 hours.

Then, 2.33 g of sodium borohydride (manufactured by Wako Pure Chemical Industries) was added, and the mixture was stirred for 1 hour. After the reaction, washing procedure was carried out on a glass filter (26G-2 manufactured by TOP) using RO water of which amount was 20 times by volume relative to the gel. The washed gel was added in a separable flask, and RO water was added up to the mark of 820 mL. Further sodium borohydride (2.33 g) was added, and the mixture was stirred at 25° C. for 1 hour. After the reaction, washing procedure was carried out on a glass filter (26G-2 manufactured by TOP) using RO water of which amount was 20 times by volume relative to the gel. The reaction with sodium borohydride at 25° C. for 1 hour was repeated 2 times, and washing procedure was finally carried out with RO water on a glass filter (26G-2 manufactured by TOP) until the conductivity of the filtrate became not more than 5 µS/cm, to obtain a glucosaminized porous base matrix.

The amount of glucosamine to be introduced in the porous base matrix was 11.0 µmol/mL per 1 mL of the porous base matrix. The content of remaining formyl group which could not be treated with a reducing agent after the immobilization of glucosamine per 1 mL of the porous base matrix was 0.4 µmol.

To the obtained glucosaminized porous base matrix (80 mL), RO water was added to make the total volume 120 mL, and the mixture was transferred into a separable flask. A 11.5 mg/mL sodium periodate aqueous solution was prepared. The solution (40 mL) was added, and the mixture was stirred using a stirrer (MAZELA Z) with rotation number of 150 rpm at 25° C. for 30 minutes. After the reaction, washing procedure was carried out on a glass filter (26G-2 manufactured by TOP) using RO water until the conductivity of the filtrate became not more than 5 µS/cm, to obtain a formyl group-containing porous base matrix. The content of formyl group was 3.4 µmol per 1 mL of the porous base matrix.

Example 3

A glucosaminized porous base matrix was obtained and a formyl group-containing porous base matrix was subsequently obtained by the same method as Example 2 except that the reaction condition was at 15° C. for 1 hour once and at 37° C. for 1 hour twice instead of at 15° C. for 1 hour once and at 25° C. for 1 hour six times in the reductive reaction after glucosamine immobilization. The amount of glucosamine to be introduced was 9.6 µmol/mL per 1 mL of the glucosaminized porous base matrix. The content of remaining formyl group which could not be treated with a reducing agent after the immobilization of glucosamine per 1 mL of the porous base matrix was 0.3 µmol. The content of the remaining formyl group of the formyl group-containing porous base matrix was 4.3 µmol per 1 mL of the porous base matrix.

Example 4

A glucosaminized porous base matrix was obtained and a formyl group-containing porous base matrix was obtained by the same method as Example 2 except that the reaction condition was at 15° C. for 1 hour once and at 50° C. for 1 hour once instead of at 15° C. for 1 hour once and at 25° C. for 1 hour six times in the reductive reaction after glucosamine immobilization. The amount of glucosamine to be introduced was 8.7 µmol/mL per 1 mL of the glucosaminized porous base matrix. The content of the remaining formyl group which could not be treated with a reducing agent after the immobilization of glucosamine was 0.4 µmol per 1 mL of the porous base matrix. The content of formyl group of the formyl group-containing porous base matrix was 4.3 µmol per 1 mL of the porous base matrix.

Example 5

The formyl group-containing base matrix obtained in Example 1 (109 mL) was substituted with a buffer of which pH was 11 and contained 0.5 M sodium citrate (manufactured by Wako Pure Chemical Industries) and 0.15 M sodium chloride (manufactured by Wako Pure Chemical Industries) (327 mL) on a glass filter (26G-2 manufactured TOP). The substituted formyl group-containing porous base matrix was added into a separable flask marked at 197.6 mL with a buffer of which pH was 11 and contained 0.5 M sodium citrate and 0.15 M sodium chloride. A 52.85 mg/mL protein A solution (PNXL30 manufactured by KANEKA corporation) of which protein A was prepared by the method described in WO2006/004067 (16.5 mL) was added thereto, and the pH was adjusted to 11 using a 4 N NaOH (prepared from NaOH manufactured by Wako Pure Chemical Industries and RO water) and the total volume of the reaction mixture was adjusted to 197.6 mL. The mixture was stirred in a thermostat bash (Thermostatic water bath T-2S manufactured by THOMAS KAGAKU Co., Ltd.) with an input-cooler (ADVANTEC TBC120DA) using a stirrer (MAZELA Z) with rotation number of 150 rpm at 4° C. for 12 hours.

After the reaction, the pH of the reaction mixture was adjusted to 6.8 using 4 M hydrochloric acid (prepared from hydrochloric acid manufactured by Wako Pure Chemical Industries and RO water). Then, 0.309 g of sodium borohydride (manufactured by Wako Pure Chemical Industries) was added thereto, and the mixture was gently stirred at 4° C. for 1 hour. After the reaction, the absorbance of maximum absorption around 277 nm of the reaction mixture was measured; as a result, the amount of protein A as affinity ligand to be introduced was 7.2 mg per 1 mL of the porous base matrix.

The porous base matrix after the reaction was washed with RO water of which amount was 20 times by volume relative to the porous base matrix on a glass filter (26G-2 manufactured by TOP), and the washed base matrix was added into a separable flask. RO water was added up to the mark of 197.6 mL, and sodium borohydride (0.309 g) was added, and the mixture was stirred at 25° C. for 1 hour. After the reaction, washing procedure was carried out with RO water of which volume was 20 times. Then, substitutive procedure was carried out using 3 times volume of 0.01 M hydrochloric acid (prepared from hydrochloric acid manufactured by Wako Pure Chemical Industries and RO water). To the substituted porous base matrix, 0.01 M hydrochloric acid was added to make the total volume 220 mL, and the mixture was added into a separable flask and stirred at room temperature for 30 minutes for acid washing.

After the acid washing, the porous base matrix was washed on a glass filter (26G-2 manufactured by TOP) using RO water of which amount was 20 times by volume relative to the porous base matrix, and then substitutive procedure was carried out with 3 times volume of an aqueous solution of 0.05 M sodium hydroxide and 1 M sodium sulfate (prepared from sodium hydroxide and sodium sulfate and RO water manufactured by Wako Pure Chemical Industries). To the substituted porous base matrix, an aqueous solution of 0.05 M sodium hydroxide and 1 M sodium sulfate to make the total volume 220 mL. The mixture was added into a separable flask, and stirred at room temperature for 20 minutes for alkali washing.

After the alkali washing, the porous base matrix was washed on a glass filter (26G-2 manufactured by TOP) using RO water of which amount was 20 times by volume relative to the porous base matrix, and then substitutive procedure was carried out with 3 times volume of PBS (manufactured by SIGMA) of which pH was 7.4. Washing procedure was carried out until the conductivity of the filtrate became not more than 5 µS/cm, to obtain the desired adsorbent immobilized with protein A. The electric conductivity of filtrate of washing was measured using an electric conductivity meter (ESTestr10 pure+ manufactured by EUTECH INSTRUMENTS).

As the target substance for the obtained adsorbent, human polyclonal IgG (Gammagard manufactured by Baxter) was selected. The dynamic adsorbent amount and the amount of the ligand leaked into the target substance were measured; as a result, the dynamic binding capacity of IgG, i.e. 5% dynamic binding capacity, was 37 mg at first time, 37 mg at second time and 38 mg at third time. The concentration of the leaching ligand in the purified IgG was 38 ppm at first time, 20 ppm at second time and 19 ppm at third time, relative to IgG.

Example 6

An adsorbent immobilized with protein A was obtained by the same method as Example 5 using the formyl group-containing base matrix obtained in Example 2. The dynamic adsorbent amount and the amount of the ligand leaked into the target substance were measured; as a result, the dynamic binding capacity of IgG, i.e. 5% dynamic binding capacity, was 37 mg at first time, 38 mg at second time and 39 mg at third time. The concentration of the leaching ligand in the purified IgG was 23 ppm at first time, 19 ppm at second time and 19 ppm at third time, relative to IgG.

Example 7

An adsorbent immobilized with protein A was obtained by the same method as Example 5 using the formyl group-containing base matrix obtained in Example 3. The dynamic adsorbent amount and the amount of the ligand leaked into the target substance were measured; as a result, the dynamic binding capacity of IgG, i.e. 5% dynamic binding capacity, was 34 mg at first time, 35 mg at second time and 36 mg at third time. The concentration of the leaching ligand in the purified IgG was 27 ppm at first time, 24 ppm at second time and 16 ppm at third time, relative to IgG.

Example 8

An adsorbent immobilized with protein A was obtained by the same method as Example 5 using the formyl group-containing base matrix obtained in Example 4. The dynamic adsorbent amount and the amount of the ligand leaked into the target substance were measured; as a result, the dynamic binding capacity of IgG, i.e. 5% dynamic binding capacity, was 31 mg at first time, 32 mg at second time and 32 mg at third time. The concentration of the leaching ligand in the purified IgG was 16 ppm at first time, 16 ppm at second time and 8 ppm at third time, relative to IgG.

Example 9

An adsorbent was obtained by the same method as Example 7 except that the temperature for immobilizing protein A was changed from 4° C. to 21° C. The dynamic binding capacity and the amount of the ligand leaked into the target substance were measured; as a result, the dynamic binding capacity of IgG, i.e. 5% dynamic binding capacity, was 34 mg.

Example 10

An adsorbent was obtained by the same method as Example 7 except that a 17 mg/mL sodium hydroxide solution (12.4 mL) was prepared by dissolving the same amount of sodium hydroxide into RO water and the solution was added in 25 batches for 1 hour instead of adding sodium hydroxide as a powder after immobilizing protein A. The dynamic binding capacity was measured; as a result, the dynamic binding capacity of IgG, i.e. 5% dynamic binding capacity, was 39 mg for first time, 38 mg for second time and 39 mg for third time.

Example 11

An adsorbent was obtained by the same method as Example 7 except that a 17 mg/mL sodium hydroxide solution (0.5 mL) was added instead of adding sodium hydroxide as a powder after immobilizing protein A. The dynamic binding capacity and the amount of the ligand leaked into the target substance were measured; as a result, the dynamic binding capacity of IgG, i.e. 5% dynamic binding capacity, was 39 mg for second time and 39 mg for third time.

Example 12

An adsorbent was obtained by the same method as Example 7 except that dimethylamineborane (manufactured by Wako Pure Chemical Industries) of the same amount as sodium hydroxide was added as a powder instead of adding sodium hydroxide for the first time after immobilizing protein A. The dynamic binding capacity was measured; as a result, the dynamic binding capacity of IgG, i.e. 5% dynamic binding capacity, was 36 mg for first time and 38 mg for third time.

Comparative Example 1

A glucosaminized porous base matrix and Formyl group-containing porous base matrix F were obtained by the same method as Example 1 except that reductive reaction was not carried out after immobilizing glucosamine. The amount of glucosamine to be introduced in the porous base matrix was 20.2 μmol per 1 mL of the porous base matrix. The content of the remaining formyl group which could not be treated with a reducing agent after the immobilization of glucosamine was 7 μmol. The content of formyl group of the formyl group-containing base matrix was 14.5 μmol per 1 mL of the Porous base matrix F. An adsorbent immobilized with protein A was obtained by the same method as Example 5 using the obtained formyl group-containing porous base matrix. The dynamic binding capacity and the amount of the ligand leaked into the target substance were measured; as a result, the dynamic binding capacity of IgG, i.e. 5% dynamic binding capacity, was 37 mg at first time, 38 mg at second time and 38 mg at third time. The concentration of the leaching ligand in the purified IgG was 87 ppm at first time, 47 ppm at second time and 56 ppm at third time, relative to IgG.

Comparative Example 2

To the Porous particle B obtained in Production Example 1 (64 mL), RO water was added to make the total volume 96 mL, and the mixture was transferred into a separable flask. The separable flask was immersed in a thermostat bash (Thermostatic water bath T-2S manufactured by THOMAS KAGAKU Co., Ltd.) at 25° C. A 1.44 mg/mL sodium periodate aqueous solution (64 mL) was prepared by dissolving sodium periodate (manufactured by Wako Pure Chemical Industries) in RO water. The solution was added into the separable flask, and the mixture was stirred using a stirrer (MAZELA Z) with rotation number of 120 rpm at 25° C. for 1 hour. After the reaction, the porous particle was washed with RO water on a glass filter (26G-2 manufactured TOP) until the conductivity of the filtrate became not more than 5 μS/cm, to obtain Formyl group-containing porous base matrix G. The content of formyl group of the obtained Porous base matrix G was measured; as a result, the content of formyl group was 5.9 μmol per 1 mL of the porous base matrix.

The formyl group-containing base matrix (54.5 mL) was substituted with a buffer of which pH was 11 and contained 0.5 M phosphoric acid (manufactured by Wako Pure Chemical Industries) and 0.15 M sodium chloride (manufactured by Wako Pure Chemical Industries) (165 mL) on a glass filter (26G-2 manufactured TOP). To the substituted formyl group-containing porous base matrix, a buffer of which pH was 11 and contained 0.5 M phosphoric acid and 0.15 M sodium chloride was added to make the total amount 90.5 mL. The mixture was added into a separable flask. A 52.85 mg/mL protein A solution (PNXL30 manufactured by KANEKA corporation) of which protein A was prepared by the method described in WO2006/004067 (8.25 mL) was added thereto, and the mixture was stirred in a thermostat bash (Thermostatic water bath T-2S manufactured by THOMAS KAGAKU Co., Ltd.) with an input-cooler (AD-VANTEC TBC120DA) using a stirrer (MAZELA Z) with rotation number of 150 rpm at 4° C. for 12 hours.

After the reaction, the pH of the reaction mixture was adjusted to 8 using 4M hydrochloric acid (prepared from hydrochloric acid manufactured by Wako Pure Chemical Industries and RO water). Then, 0.155 g of sodium borohydride (manufactured by Wako Pure Chemical Industries) was added thereto, and the mixture was gently stirred at 4° C. for 1 hour. After the reaction, the absorbance of maximum absorption around 276 nm of the reaction mixture was measured; as a result, the amount of protein A as affinity ligand to be introduced was 6.7 mg per 1 mL of the porous base matrix.

The porous base matrix after the reaction was washed with RO water of which amount was 20 times by volume relative to the porous base matrix on a glass filter (26G-2 manufactured by TOP), and RO water was added to the washed base matrix to make the total volume 109 mL. The mixture was added into a separable flask. Sodium borohydride (0.155 g) was added thereto, and the mixture was stirred at 25° C. for 1 hour. After the reaction, washing procedure was carried out with 20 times by volume of RO water. Then substitutive procedure was carried out using 3 times volume of 0.01 M hydrochloric acid (prepared from hydrochloric acid manufactured by Wako Pure Chemical Industries and RO water). To the substituted porous base matrix, 0.01 M hydrochloric acid was added to make the total volume 109 mL, and the mixture was into a separable flask and stirred at room temperature for 30 minutes for acid washing.

After the acid washing, the porous base matrix was washed on a glass filter (26G-2 manufactured by TOP) using RO water of which amount was 20 times by volume relative to the porous base matrix, and then substitutive procedure was carried out with 3 times volume of a aqueous solution of 0.05 M sodium hydroxide and 1 M sodium sulfate (prepared from sodium hydroxide and sodium sulfate and RO water manufactured by Wako Pure Chemical Industries). To the substituted porous base matrix, an aqueous solution of 0.05 M sodium hydroxide and 1 M sodium sulfate to make the total volume 109 mL. The mixture was added into a separable flask and stirred at room temperature for 20 minutes for alkali washing.

After the alkali washing, the porous base matrix was washed on a glass filter (26G-2 manufactured by TOP) using RO water of which amount was 20 times by volume relative to the porous base matrix, and then substitutive procedure was carried out with 3 times volume of PBS (manufactured by SIGMA) relative to the gel and of which pH was 7.4. Washing procedure was carried out until the conductivity of the filtrate became not more than 5 μS/cm, to obtain the desired adsorbent immobilized with protein A. The electric conductivity of filtrate of washing was measured using an electric conductivity meter (ESTestr10 pure+ manufactured by EUTECH INSTRUMENTS).

The dynamic binding capacity and the amount of the ligand leaked into the target substance were measured; as a result, the dynamic binding capacity of IgG, i.e. 5% dynamic binding capacity, was 35 mg at first time, 35 mg at second time and 35 mg at third time. The concentration of the leaching ligand in the purified IgG was >100 ppm at first time, >100 ppm at second time and >100 ppm at third time, relative to IgG.

Comparative Example 3

A crosslinked porous particle was obtained by the same method as Production Example 1 except that CK-A manufactured by Chisso Corporation was not classified. Then, RO water was added to the crosslinked porous particle (11 mL) to make the total volume 12.6 mL, and the mixture was added into a centrifuge tube (50 mL, manufactured by IWAKI GARASU). To the centrifuge tube, 3.7 mL of 2 M sodium hydroxide aqueous solution (prepared from sodium hydroxide manufactured by Wako Pure Chemical Industries and RO water) was added. The mixture was heated to 40° C. for 30 minutes. After the temperature of the mixture became 40° C., 1.3 mL of epichlorohydrin (manufactured by Wako Pure Chemical Industries) was added thereto, and the mixture was shaken using a thermostat shaking apparatus (Thermostatic water bath T-25 manufactured by THOMAS KAGAKU Co., Ltd.) at 100 rotation/minute at 40° C. for 2 hours.

After the reaction, washing procedure was carried out on a glass filter (26G-2 manufactured TOP) using RO water of which amount was 20 times by volume relative to the porous particle, to obtain epoxidized porous particle of which epoxy content was 5.7 μmol per 1 mL of the porous particle. The epoxidized porous particle (9.5 mL) was substituted with a 0.5 M carbonate buffer of which pH was 10 (prepared from sodium hydrogencarbonate, sodium carbonate and RO water manufactured by Wako Pure Chemical Industries) (30 mL) on a glass filter (26G-2 manufactured TOP). To the epoxidized porous particle after substitution, a 0.5 M carbonate buffer of which pH was 10 was added to make the total volume 19 mL, and the mixture was added into a centrifuge tube (50 mL, manufactured by IWAKI GARASU). A hydrochloride salt of D(+)-glucosamine (manufactured by Wako Pure Chemical Industries) (0.18 g) was added thereto, and the mixture was shaken using a thermostat shaking apparatus (Thermostatic water bath T-25 manufactured by THOMAS KAGAKU Co., Ltd.) at 100 rotation/minute at 50° C. overnight.

After the reaction, washing procedure was carried out on a glass filter (26G-2 manufactured TOP) using RO water of which amount was 20 times by volume relative to the porous base matrix, to obtain glucosaminized porous base matrix of which amount of glucosamine was 1.4 μmol per 1 mL of the porous base matrix. To the obtained glucosaminized porous base matrix (10 mL), RO water was added to make the total amount 15 mL. The mixture was added into a centrifuge tube (50 mL, manufactured by IWAKI GARASU). Sodium periodate (manufactured by Wako Pure Chemical Industries) (115 mg) was dissolved in RO water (10 mL), and the sodium periodate aqueous solution was added to the centrifuge tube. The mixture was shaken using a mixrotor (Variable mixrotor VMR-5 manufactured IUCHISEIEIDO) in an incubator (Incubator LOW-TEMP ICB-151L manufactured by IWAKI GARASU) at 100 rotation/minute at 25° C. for 1 hour.

After the reaction, washing procedure was carried out on a glass filter (26G-2 manufactured TOP) using RO water of which amount was 20 times by volume relative to the porous base matrix, to obtain a formyl group-containing porous base matrix. The content of formyl group of the obtained formyl group-containing porous base matrix was measured by the above-described method; as a result, the content of formyl group was 5.9 μmol per 1 mL of the porous base matrix.

The formyl group-containing base matrix (7.1 mL) was substituted with a buffer of which pH was 10 and contained 0.5 M phosphoric acid and 0.15 M sodium chloride (prepared from bissodium phosphorate, sodium chloride, sodium hydroxide and RO water manufactured by Wako Pure Chemical Industries) (30 mL) on a glass filter (26G-2 manufactured TOP). To the substituted formyl group-containing porous base matrix, a buffer of which pH was 10 and which contained 0.5 M phosphoric acid and 0.15 M sodium chloride was added to make the total amount 11.8 mL. The mixture was added into a centrifuge tube (50 mL, manufactured by IWAKI GARASU). A 52.6 mg/mL protein A solution (PNXL28 manufactured by KANEKA corporation) of which protein A was prepared by the method described in WO2006/004067 (1.08 mL) was added thereto, and the mixture was shaken using a mixrotor (Variable mixrotor VMR-5 manufactured IUCHISEIEIDO) in an incubator (Incubator LOW-TEMP ICB-151L manufactured by IWAKI GARASU) at 100 rotation/minute at 4° C. for 12 hours.

After the pH of the reaction mixture was adjusted to 8 using 4 M hydrochloric acid (prepared from hydrochloric acid manufactured by Wako Pure Chemical Industries and RO water), sodium borohydride (0.02 g) was added thereto. The mixture was gently stirred at 4° C. for 1 hour. After the reaction, the absorbance of maximum absorption around 277 nm of the reaction mixture was measured; as a result, the amount of protein A as affinity ligand to be introduced was 4.7 mg per 1 mL of the porous base matrix.

After the reaction, the porous base matrix was washed with RO water on a glass filter (26G-2 manufactured TOP) until the conductivity of the filtrate became not more than 5 μS/cm, to obtain the desired adsorbent immobilized with protein A.

As the target substance for the obtained adsorbent, human polyclonal IgG (Gammagard manufactured by Baxter) was selected. The dynamic binding capacity and the amount of the leaching ligand in the target substance were measured; as a result, the dynamic binding capacity of IgG, i.e. 5% dynamic binding capacity, was 22 mg at first time, 23 mg at second time and 27 mg at third time. The concentration of the leaching ligand in the purified IgG was 297 ppm at first time, 214 ppm at second time and 198 ppm at third time, relative to IgG.

Production Example 2

To the Porous particle B obtained by the same method as Production Example 1 (100 mL), RO water was added to make the total volume 150 mL, and the mixture was transferred into a separable flask (manufactured by TOP, 500 mL). Sodium periodate (manufactured by Wako Pure Chemical Industries) (2.30 g) was dissolved in RO water (50 mL), and the solution was added into the separable flask. The mixture was stirred with rotation number of 150 rpm at 25° C. for 15 minutes. After the reaction, washing procedure was carried out on a glass filter (26G-2 manufactured TOP) using RO water of which amount was 20 times by volume relative to the porous particle, to obtain Porous particle H. The content of formyl group of the obtained formyl group-containing porous particle was measured by the above-described method; as a result, the content of formyl group was 57 μmol per 1 mL of the porous particle.

Example 13

The Porous particle H prepared by the same method as Production Example 2 (99 mL) was mixed with RO water (99 mL) at 1:1, to obtain a slurry. After the temperature of the slurry was adjusted to 15° C., the slurry was suction-filtered for drying on a glass filter (26G-2 manufactured TOP) for 15 minutes. The obtained suction-dried Porous particle I was added into a glass separable flask (manufactured by TOP, 500 mL). Then, hydrochloride salt of glucosamine (glucosamine K manufactured by Kyowa Hakko Co.) (3.3 g) was added to the separable flask. Then, RO water of 15° C. was added while the hydrochloride salt of glucosamine was dissolved, and the total amount of the reaction mixture after dissolution was adjusted to 180 mL. After the temperature of the reaction mixture was adjusted to 15° C., the pH was adjusted to 10 and the total amount of the reaction mixture was adjusted to 198 mL using 4 N sodium hydroxide aqueous solution and RO water. Then, the mixture was stirred at 150 rotation/minute at 15° C. for 5 hours. Then, sodium borohydride (manufactured by Wako Pure Chemical Industries) (0.56 g) was added, and the mixture was stirred at 150 rotation/minute at 15° C. for 60 minutes. After the reaction, washing procedure was carried out with RO water of which amount was 40 times by mole relative to the porous base matrix on a glass filter (26G-2 manufactured TOP).

"Then, all of the washed porous base matrix was added into a glass separable flask (manufactured by TOP, 500 mL), and RO water was added to make the total volume 198 mL. Then, sodium borohydroxide (manufactured by Wako Pure Chemical Industries) (0.56 g) was added, and the mixture was stirred at 150 rotation/minute at 15° C. for 60 minutes. After the reaction, washing procedure was carried out on a glass filter (26G-2 manufactured by TOP) using RO water of which amount was 40 times by volume relative to the porous base matrix." The above-described procedure in " " was repeated two times, to obtain the desired porous base matrix. The amount of glucosamine to be immobilized in the porous base matrix was measured by non-water titration; as a result, the amount was 10 µmol per 1 mL of the base matrix.

Example 14

A porous base matrix was prepared by the same method as Example 13 except that pH was adjusted to 9 after the addition of the hydrochloride salt of glucosamine. The amount of glucosamine to be immobilized was 10 µmol per 1 mL of the porous base matrix.

Example 15

A porous base matrix was prepared by the same method as Example 13 except that pH was adjusted to 8 after the addition of the hydrochloride salt of glucosamine. The amount of glucosamine to be immobilized was 10 µmol per 1 mL of the porous base matrix.

Example 16

The porous base matrix prepared in Example 13 (94 mL) was substituted with a 0.01 M citrate buffer (prepared from trisodium citrate dihydrate, citric acid monohydrate and RO water manufactured by Wako Pure Chemical Industries) (280 mL), and the buffer was added to make the total volume 141 mL. The mixture was added into a separable flask (manufactured by TOP, 500 mL). Sodium periodate (manufactured by Wako Pure Chemical Industries) (0.54 g) was dissolved in RO water (94 mL), and the sodium periodate aqueous solution was added in the separable flask. The mixture was stirred at 150 rotation/minute at 5° C. for 40 minutes. After the reaction, washing procedure was carried out with RO water of which amount was 40 times by volume relative to the porous base matrix on a glass filter (26G-2 manufactured TOP), to obtain formyl group-containing porous base matrix. The content of formyl group of the obtained base matrix was measured by the above-described method; as a result, the content of formyl group was 4 µmol per 1 mL of the porous base matrix.

The formyl group-containing base matrix (92.8 mL) was substituted with a buffer containing 0.6 M trisodium citrate dihydrate and 0.2 M sodium chloride (prepared from trisodium citrate dihydrate, sodium chloride and RO water manufactured by Wako Pure Chemical Industries) (280 mL), and a buffer containing 0.6 M trisodium citrate and 0.2 M sodium chloride was added to make the total volume 132 mL. The mixture was added into a separable flask (manufactured by TOP, 500 mL). A 52.8 mg/mL protein A solution (PNXL35 manufactured by KANEKA corporation) of which protein A was prepared by the method described in WO2006/004067 (14.06 mL) was added thereto, and the pH was adjusted to 12 using a 0.08 N NaOH (prepared from NaOH manufactured by Wako Pure Chemical Industries and RO water), and the mixture was stirred at 150 rotation/minute at 4° C. for 4 hours.

After the reaction, the pH of the reaction mixture was adjusted to 7 using 0.1 M citric acid (prepared from citric acid monohydrate and RO water manufactured by Wako Pure Chemical Industries). Then, dimethylaminoborane (408 mg) was added thereto, and the mixture was stirred at 150 rotation/minute at 4° C. for 1 hour and then at 150 rotation/minute at 25° C. for 8 hours. After the reaction, the absorbance of maximum absorption around 277 nm of the reaction mixture was measured; as a result, the amount of protein A as affinity ligand to be introduced was 7.6 mg per 1 mL of the porous base matrix.

The porous base matrix after the reaction was washed with RO water of which amount was 10 times by volume relative to the porous base matrix on a glass filter (26G-2 manufactured by TOP), and substitutive procedure was carried out using 0.1 M citric acid (prepared from citric acid monohydrate manufactured by Wako Pure Chemical Industries and RO water). Then, 0.1 M citric acid was added to the substituted base matrix, to make the total volume 186 mL. The mixture was added into a separable flask (manufactured by TOP, 500 mL), and stirred at 150 rotation/minute at 25° C. for 30 minutes for acid washing.

After the acid washing, the porous base matrix was substituted with an aqueous solution of 0.05 M sodium hydroxide and 1 M sodium sulfate (prepared from sodium hydroxide, sodium sulfate and RO water manufactured by Wako Pure Chemical Industries) of which volume was 3 times by volume on a glass filter (26G-2 manufactured by TOP). To the substituted porous base matrix, an aqueous solution of 0.05 M sodium hydroxide and 1 M sodium sulfate, to make the total volume 186 mL. The mixture was added into a separable flask and stirred at 25° C. for 20 minutes for alkali washing.

After the alkali washing, the porous base matrix was substituted with a 0.5 M citrate buffer (prepared from trisodium citrate dihydrate, citric acid monohydrate and RO water manufactured by Wako Pure Chemical Industries) (278 mL) of which pH was 6. Then, washing procedure was carried out until the conductivity of the filtrate became not more than 5 µS/cm.

Subsequently, the porous base matrix was substituted with 20% aqueous ethanol (prepared from ethanol and RO water of Japanese Pharmacopoeia), and added into a polymer container (manufactured by SANPLATEC CO., LTD.), to obtain the desired adsorbent immobilized with protein A. The electric conductivity of filtrate of washing was measured using an electric conductivity meter (ESTestr10 pure+ manufactured by EUTECH INSTRUMENTS).

As the target substance for the obtained adsorbent, human polyclonal IgG (Gammagard manufactured by Baxter) was selected. The dynamic binding capacity and the amount of the leaching ligand in the target substance were measured; as a result, the dynamic binding capacity of IgG, i.e. 5% dynamic binding capacity, was 37 mg at first time per 1 mL of the porous base matrix. The concentration of the leaching ligand in the purified IgG was 24 ppm relative to IgG. The content of formyl group of the obtained adsorbent was measured by the above-described method; as a result, the content of formyl group of the obtained adsorbent was 0.2 µmol per 1 mL of the porous base matrix.

Example 17

The desired adsorbent was obtained by the same procedure of Example 16 except that the porous base matrix prepared in Example 14 was used. The dynamic binding capacity of IgG was 37 mg per 1 mL of the porous base matrix. The concentration of the leaching ligand in the purified IgG was 22 ppm relative to IgG.

Example 18

The desired adsorbent was obtained by the same procedure of Example 16 except that the porous base matrix prepared in Example 15 was used. The dynamic binding capacity of IgG was 37 mg per 1 mL of the porous base matrix. The concentration of the leaching ligand in the purified IgG was 26 ppm relative to IgG.

Example 19

An adsorbent was prepared by the same procedure of Example 17 except that a citrate buffer (prepared from trisodium citrate dihydrate, citric acid monohydrate and RO water manufactured by Wako Pure Chemical Industries) of which pH was 2 was used instead of a citrate buffer of which pH was 3. In the Example, the content of formyl group of the formyl group-containing base matrix was 6 µmol per 1 mL of the porous base matrix, and the amount of protein A as an affinity ligand to be immobilized was 7.2 mg per 1 mL of the porous base matrix. The dynamic binding capacity of IgG was 35 mg per 1 mL of the adsorbent. The concentration of the leaching ligand in the purified IgG was 38 ppm.

Example 20

An adsorbent was prepared by the same procedure of Example 17 except that a citrate buffer (prepared from trisodium citrate dihydrate, citric acid monohydrate and RO water manufactured by Wako Pure Chemical Industries) of which pH was 5 was used instead of a citrate buffer of which pH was 3. In the Example, the content of formyl group of the formyl group-containing base matrix was 4 µmol per 1 mL of the porous base matrix, and the amount of protein A as an affinity ligand to be immobilized was 6.5 mg per 1 mL of the porous base matrix. The dynamic binding capacity of IgG was 35 mg. The concentration of the leaching ligand in the purified IgG was 42 ppm.

Example 21

The formyl group-containing base matrix prepared by the same method as Example 1 (92.8 mL) was substituted with a buffer containing 0.5 M trisodium citrate and 0.15 M sodium chloride (prepared from trisodium citrate dihydrate, sodium chloride and RO water manufactured by Wako Pure Chemical Industries) (278 mL). To the substituted formyl group-containing porous base matrix, a buffer containing 0.5 M trisodium citrate and 0.15 M sodium chloride was added to make the total volume 130 mL. The mixture was added into a separable flask (manufactured by TOP, 500 mL). A 52.85 mg/mL protein A solution (PNXL30 manufactured by KANEKA corporation) of which protein A was prepared by the method described in WO2006/004067 (14.04 mL) was added thereto, and the pH was adjusted to 11 using a 4M NaOH (prepared from NaOH manufactured by Wako Pure Chemical Industries and RO water). Further a buffer containing 0.5 M trisodium citrate and 0.15 M sodium chloride (prepared from trisodium citrate dihydrate, sodium chloride and RO water manufactured by Wako Pure Chemical Industries) of which pH was 11 was added to make the total volume 168 mL, and then the mixture was stirred at 150 rotation/minute at 4° C. for 12 hours.

After the reaction, the pH of the reaction mixture was adjusted to 6.8 using 4M hydrochloric acid (prepared from hydrochloric acid manufactured by Wako Pure Chemical Industries and RO water). Then, sodium borohydride (263 mg) was added thereto, and the mixture was stirred at 150 rotation/minute at 4° C. for 1 hour. After the reaction, the absorbance of maximum absorption around 277 nm of the reaction mixture was measured; as a result, the amount of protein A as affinity ligand to be introduced was 7.2 mg per 1 mL of the porous base matrix.

The porous base matrix after the reaction was washed with RO water of which amount was 10 times by volume relative to the porous base matrix on a glass filter (26G-2 manufactured by TOP), and all of the washed base matrix was added into a separable flask (manufactured by TOP, 500 mL). RO water was added thereto to make the total volume 168 mL. Then, sodium borohydride (263 mg) was added, and the mixture was stirred at 150 rotation/minute at 25° C. for 1 hour. After the reaction, washing procedure was carried out with RO water of which volume was 10 times by volume relative to the porous base matrix on a glass filter (26G-2 manufactured by TOP), and substitutive procedure matrix was carried out using 0.01 M hydrochloric acid (prepared from hydrochloric acid and RO water manufactured by Wako Pure Chemical Industries and RO water) of which volume was 3 times by volume. To the substituted porous base matrix, 0.01 M hydrochloric acid was added to make the total volume 168 mL, and the mixture was into a separable flask (manufactured by TOP, 500 mL) and shaked at 150 rotation/minute at 25° C. for 30 minutes for acid washing.

After the acid washing, the porous base matrix was washed on a glass filter (26G-2 manufactured by TOP) using RO water of which amount was 10 times by volume relative to the porous base matrix, and then substitutive procedure was carried out with 3 times volume of a aqueous solution of 0.05 M sodium hydroxide and 1 M sodium sulfate (prepared from sodium hydroxide and sodium sulfate and RO water manufactured by Wako Pure Chemical Industries). To the substituted porous base matrix, an aqueous solution of 0.05 M sodium hydroxide and 1 M sodium sulfate to make the total volume 168 mL. All of the mixture was added into a separable flask, and shaked at 150 rotation/minute at 25° C. for 20 minutes for alkali washing.

After the alkali washing, substitutive procedure for the porous base matrix was carried out using a 0.01 M citrate buffer (trisodium citrate dihydrate, citric acid monohydrate and RO water manufactured by Wako Pure Chemical Industries and RO water) of which pH was 6 (278 mL), and the porous base matrix was washed using RO water until the conductivity of the filtrate became not more than 5 µS/cm. Then substitutive procedure was carried out using 20% aqueous ethanol (prepared from ethanol of and RO water Japanese Pharmacopoeia), and the porous base matrix was added into a 250 mL polymer container (manufactured by SANPLATEC CO., LTD.) using 20% aqueous ethanol, to obtain the desired adsorbent immobilized with protein A. The electric conductivity of filtrate of washing was measured using an electric conductivity meter (ESTestr10 pure+ manufactured by EUTECH INSTRUMENTS).

As the target substance for the obtained adsorbent, human polyclonal IgG (Gammagard manufactured by Baxter) was selected. The dynamic binding capacity and the amount of the leaching ligand in the target substance were measured; as a result, the dynamic binding capacity of IgG, i.e. 5% dynamic binding capacity, was 36 mg at first time, 36 mg at second time and 37 mg at third time. The concentration of the leaching ligand in the purified IgG was 69 ppm at first time, 47 ppm at second time and 36 ppm at third time.

Example 22

An adsorbent was prepared by the same procedure of Example 21 except that a buffer containing 0.025 M phosphoric acid and 1.5 M sodium sulfate (prepared from disodium hydrogenphosphate Duodecihydrate, sodium sulfate and RO water manufactured by Wako Pure Chemical Industries) was used instead of a buffer containing 0.5 M trisodium citrate and 0.15 M sodium chloride, and a buffer, containing 0.025 M phosphoric acid and 1.5 M sodium sulfate (prepared from disodium hydrogenphosphate Duodecihydrate, sodium sulfate and RO water manufactured by Wako Pure Chemical Industries) of which pH was 11 instead of a buffer containing 0.5 M trisodium citrate and 0.15 M sodium chloride of which pH was 11. The amount of protein A as affinity ligand to be introduced was measured similarly to Example 2; as a result, the amount was 7.4 mg per 1 mL of the porous base matrix.

Example 23

An adsorbent was prepared by the same method of Example 21 except that the pH to be adjusted to 11 in Example 21 was changed to 12.5. The amount of protein A to be immobilized was 6.0 mg per 1 mL of the porous base matrix, and the dynamic binding capacity of IgG, i.e. 5% dynamic binding capacity, was 33 mg for first time, 33 mg for second time and 33 mg for third time. The concentration of the leaching ligand in the purified IgG was 35 ppm for first time.

Example 24

An adsorbent was prepared by the same method of Example 21 except that the pH to be adjusted to 11 in Example 21 was changed to 13. The amount of protein A to be immobilized was 4.0 mg per 1 mL of the porous base matrix, and the dynamic binding capacity of IgG, i.e. 5% dynamic binding capacity, was 28 mg for first time, 33 mg for second time and 33 mg for third time. The concentration of the leaching ligand in the purified IgG was 23 ppm for first time.

Example 25

An adsorbent was prepared by the same method of Example 21 except that the pH to be adjusted to 11 in Example 21 was changed to 10. The amount of protein A to be immobilized was 4.0 mg per 1 mL of the porous base matrix, and the dynamic binding capacity of IgG, i.e. 5% dynamic binding capacity, was 29 mg.

Example 26

The formyl group-containing base matrix prepared by the same method as Example 1 (92.8 mL) was substituted with a buffer containing 0.6 M trisodium citrate and 0.2 M sodium chloride (prepared from trisodium citrate dihydrate, sodium chloride and RO water manufactured by Wako Pure Chemical Industries) (280 mL). To the substituted Porous base matrix F, a buffer containing 0.6 M trisodium citrate and 0.2 M sodium chloride was added to make the total volume 132 mL. The mixture was added into a separable flask (manufactured by TOP, 500 mL). A 52.8 mg/mL protein A solution (PNXL35 manufactured by KANEKA corporation) of which protein A was prepared by the method described in WO2006/004067 (14.06 mL) was added thereto, and the pH was adjusted to 12 using a 0.08 N NaOH aqueous solution (prepared from NaOH manufactured by Wako Pure Chemical Industries and RO water) and the mixture was stirred at 150 rotation/minute at 4° C. for 4 hours. The pH of the reaction mixture after the reaction was adjusted to 7 using 0.1 M citric acid (prepared from citric acid monohydrate and RO water manufactured by Wako Pure Chemical Industries). The mixture was stirred at the same temperature for 1 hour, and then dimethylamineborane (408 mg) was added. The mixture was stirred at 150 rotation/minute at 4° C. for 1 hour and at 150 rotation/minute at 25° C. for 5 hours.

The porous base matrix after the reaction was washed with RO water of which amount was 10 times by volume relative to the porous base matrix on a glass filter (26G-2 manufactured by TOP), and substitutive procedure was carried out using 3 times by volume of 0.1 M citric acid (prepared by citric acid monohydrate manufactured by Wako Pure Chemical Industries and RO water). To the substituted porous base matrix, 0.1 M citric acid was added to make the total volume 186 mL, and the mixture was added into a separable flask (manufactured by TOP, 500 mL) and stirred at 150 rotation/minute at 25° C. for 30 minutes for acid washing.

After the acid washing for the porous base matrix, substitutive procedure was carried out using an aqueous solution of 0.05 M sodium hydroxide and 1 M sodium sulfate (prepared from sodium hydroxide and sodium sulfate and RO water manufactured by Wako Pure Chemical Industries) on a glass filter (26G-2 manufactured by TOP). To the substituted porous base matrix, an aqueous solution of 0.05 M sodium hydroxide and 1 M sodium sulfate to make the total volume 186 mL. All of the mixture was added into a separable flask and stirred at 150 rotation/minute at 25° C. for 20 minutes for alkali washing.

After the alkali washing, substitutive procedure for the porous base matrix was carried out using a 0.5 M citrate buffer of which pH was 6 (prepared from trisodium citrate dihydrate, citric acid monohydrate and RO water manufactured by Wako Pure Chemical Industries) (278 mL) on a glass filter (26G-2 manufactured by TOP). The porous base matrix was washed using RO water until the conductivity of the filtrate became not more than 5 µS/cm. Then, substitutive procedure was carried out using 20% aqueous ethanol (prepared from ethanol of and RO water Japanese Pharmacopoeia), and the porous base matrix was added into a 250 mL polymer container (manufactured by SANPLATEC CO., LTD.) using 20% aqueous ethanol, to obtain the desired adsorbent immobilized with protein A. The porous base matrix was washed using RO water until the conductivity of the filtrate became not more than 5 µS/cm. Then, substitutive procedure was carried out using 20% aqueous ethanol (prepared from ethanol of and RO water Japanese Pharmacopoeia), and the porous base matrix was added into a 250 mL polymer container (manufactured by SANPLATEC CO., LTD.) using 20% aqueous ethanol, to obtain the desired adsorbent immobilized with protein A. The electric conductivity of filtrate of washing was measured using an electric conductivity meter (ESTestr10 pure+ manufactured by EUTECH INSTRUMENTS).

As the target substance for the obtained adsorbent, human polyclonal IgG (Gammagard manufactured by Baxter) was selected. The dynamic binding capacity and the amount of the leaching ligand in the target substance were measured; as a result, the dynamic binding capacity of IgG, i.e. 5% dynamic binding capacity, was 34 mg per 1 mL of the porous base matrix. The concentration of the leaching ligand in the purified IgG was 30 ppm.

Example 27

An adsorbent was prepared by the same method of Example 26 except that the duration time for stirring at the same temperature after the pH was adjusted to 7 using 0.1 M citric acid was 2 hours. The dynamic binding capacity of IgG was 36 mg per 1 mL of the porous base matrix.

Example 28

An adsorbent was prepared by the same method of Example 26 except that the duration time for stirring at the same temperature after the pH was adjusted to 7 using 0.1 M citric acid was 4 hours. The dynamic binding capacity of IgG was 37 mg per 1 mL of the porous base matrix, and the concentration of the leaching ligand in the purified IgG was 22 ppm.

Example 29

An adsorbent was prepared by the same method of Example 26 except that the duration time for stirring at the same temperature after the pH was adjusted to 7 using 0.1 M citric acid was 6 hours. The dynamic binding capacity of IgG was 36 mg per 1 mL of the porous base matrix, and the concentration of the leaching ligand in the purified IgG was 45 ppm.

Example 30

An adsorbent was prepared by the same method of Example 26 except that the duration time for stirring at the same temperature after the pH was adjusted to 7 using 0.1 M citric acid was 15 hours. The dynamic binding capacity of IgG was 37 mg per 1 mL of the porous base matrix Example 31

An adsorbent was prepared by the same method of Example 26 except that the pH was adjusted to 3 using 1.6 M citric acid after protein A was reacted at pH 12 and the duration time of subsequent stirring at the same temperature was 4 hours. The dynamic binding capacity of IgG was 36 mg per 1 mL of the porous base matrix, and the concentration of the leaching ligand in the purified IgG was 30 ppm.

Example 32

An adsorbent was prepared by the same method of Example 26 except that dimethylamineborane was added immediately after the pH was adjusted to 7 using 0.1 M citric acid. The dynamic binding capacity of IgG was 31 mg per 1 mL of the porous base matrix, and the concentration of the leaching ligand in the purified IgG was 22 ppm.

Example 33

An adsorbent was prepared by the same method of Example 33 except that substitutive procedure for Porous particle B prepared by Production Example 1 was carried out using a citrate buffer (prepared from trisodium citrate dihydrate, citric acid monohydrate and RO water manufactured by Wako Pure Chemical Industries) (282 mL), and the amount of the mixture was adjusted using the buffer, and 0.16 g of sodium periodate was used. The content of formyl group of the Porous base matrix E was 7 μmol per 1 mL of the porous base matrix, and the amount of protein A as an affinity ligand to be immobilized was 5.0 mg per 1 mL of the porous base matrix. The dynamic binding capacity of IgG was 31 mg, and the concentration of the leaching ligand in the purified IgG was 36 ppm. The content of formyl group of the obtained adsorbent was 0.2 μmol per 1 mL of the porous base matrix.

Comparative Example 4

An adsorbent was prepared by the same method of Example 16 except that dimethylamineborane was not used. The content of formyl group of the obtained adsorbent was 2 μmol per 1 mL of the porous base matrix. The dynamic binding capacity of IgG was 27 mg per 1 mL of the adsorbent, and the concentration of the leaching ligand in the purified IgG was 615 ppm.

The invention claimed is:

1. A method for producing a formyl group-containing porous base matrix, comprising the steps of:
   (a) introducing a spacer in a formyl group-containing porous particle by reacting formyl groups therein with functional groups in the spacer; subsequent to step (a),
   (b) treating formyl groups in said particle not used for introducing the spacer so that the formyl group content in the porous base matrix after introduction of the spacer is not more than 3 μmol per 1 mL of the porous particle; and, subsequent to step (b),
   (c) oxidizing the spacer with periodic acid and/or a periodate, to transform a portion of the spacer into a formyl group.

2. The production method of a formyl group-containing porous base matrix according to claim 1, wherein the introduced spacer is a sugar or a sugar analog.

3. The production method of a formyl group-containing porous base matrix according to claim 1, wherein the introduced spacer is glucosamine.

4. The production method of a formyl group-containing porous base matrix according to claim 1, wherein the porous particle contains a polysaccharide.

5. The production method of a formyl group-containing porous base matrix according to claim 4, wherein the polysaccharide is cellulose and/or a cellulose derivative.

6. The production method of a formyl group-containing porous base matrix according to claim 1, wherein the porous particle is crosslinked.

7. A formyl group-containing porous base matrix, obtained by the production method of a formyl group-containing porous base matrix according to claim 1.

8. A method for producing an adsorbent comprising the step of immobilizing an amino group-containing ligand on the formyl group-containing base matrix according to claim 7.

9. An adsorbent, obtained by the production method according to claim 8.

10. A method for purification, wherein the adsorbent according to claim 9 is used.

* * * * *